(12) United States Patent
Stevens et al.

(10) Patent No.: US 8,838,590 B2
(45) Date of Patent: Sep. 16, 2014

(54) AUTOMATIC MEDIA ARTICLE COMPOSITION USING PREVIOUSLY WRITTEN AND RECORDED MEDIA OBJECT RELATIONSHIP DATA

(75) Inventors: Timothy S Stevens, Woodbridge (GB); Alex SJ Palmer, Felixstowe (GB); Ian C Kegel, Kesgrave (GB); Jeremy M Thorne, Ipswich (GB); Louie KS Lim, Ipswich (GB); Ludvig Lohse, London (GB); Martin Russ, Ipswich (GB); Jason Morphett, Halesworth (GB); Adam Hay, Nottingham (GB)

(73) Assignee: British Telecommunications public limited company, London (GB)

( * ) Notice: Subject to any disclaimer, the term of this patent is extended or adjusted under 35 U.S.C. 154(b) by 860 days.

(21) Appl. No.: 10/525,381

(22) PCT Filed: Sep. 15, 2003

(86) PCT No.: PCT/GB03/03976
§ 371 (c)(1),
(2), (4) Date: Feb. 23, 2005

(87) PCT Pub. No.: WO2004/025508
PCT Pub. Date: Mar. 25, 2004

(65) Prior Publication Data
US 2006/0010162 A1    Jan. 12, 2006

(30) Foreign Application Priority Data

Sep. 13, 2002 (GB) ................................. 0221328.8
Apr. 4, 2003 (GB) ................................. 0307859.9

(51) Int. Cl.
*G06F 17/30* (2006.01)
*G11B 27/034* (2006.01)

(52) U.S. Cl.
CPC .... *G06F 17/30817* (2013.01); *G06F 17/30038* (2013.01); *G06F 17/30867* (2013.01); *G11B 27/034* (2013.01); *G06F 17/30828* (2013.01)
USPC ........... 707/736; 707/737; 707/752; 707/755; 707/805

(58) Field of Classification Search
USPC ...................... 707/7, 100, 102, 103 R, 104.1; 715/500.1, 513
See application file for complete search history.

(56) References Cited

U.S. PATENT DOCUMENTS 5,027,420 A * 6/1991 Takebayashi et al. ........ 382/274
5,267,351 A * 11/1993 Reber et al. ................ 707/104.1

(Continued)

FOREIGN PATENT DOCUMENTS

| EP | 1 083 567 | 3/2001 |
| JP | 2001-143445 | 5/2001 |

(Continued)

OTHER PUBLICATIONS

Ursula Wolz , Daniel Domen , Michael McAuliffe, "Multi-media integrated into CS 2: an interactive children's story as a unifying class project", ACM SIGCSE Bulletin, v.29 n. 3; p. 103-110, Sep. 1997.*

(Continued)

*Primary Examiner* — Anh Tai Tran
(74) *Attorney, Agent, or Firm* — Nixon & Vanderhye P.C.

(57) ABSTRACT

Metadata is associated with media elements in a content store during automatic composition of media articles. The metadata includes relationship data indicating how what is portrayed by that media element relates to what is portrayed by one or more other media elements. Because relationship metadata is included media articles can be generated automatically with the need for the production of a detailed framework describing that media article.

12 Claims, 30 Drawing Sheets

(56) References Cited

U.S. PATENT DOCUMENTS

| | | | | |
|---|---|---|---|---|
| 5,584,006 A | * | 12/1996 | Reber et al. | 711/100 |
| 5,619,636 A | * | 4/1997 | Sweat et al. | 715/500.1 |
| 5,708,767 A | | 1/1998 | Yeo et al. | |
| 5,724,605 A | * | 3/1998 | Wissner | 715/500.1 |
| 5,752,029 A | * | 5/1998 | Wissner | 707/104.1 |
| 5,754,851 A | * | 5/1998 | Wissner | 707/104.1 |
| 5,767,846 A | * | 6/1998 | Nakamura et al. | 715/500.1 |
| 6,029,195 A | | 2/2000 | Herz | |
| 6,204,840 B1 | * | 3/2001 | Petelycky et al. | 715/500.1 |
| 6,243,087 B1 | | 6/2001 | Davis et al. | |
| 6,701,316 B1 | | 3/2004 | Li et al. | |
| 8,037,105 B2 | | 10/2011 | Kegel et al. | |
| 2001/0009423 A1 | | 7/2001 | Davis et al. | |
| 2002/0003506 A1 | | 1/2002 | Freiberger et al. | |
| 2002/0013943 A1 | | 1/2002 | Haberman et al. | |
| 2002/0056095 A1 | | 5/2002 | Uehara et al. | |
| 2002/0122430 A1 | | 9/2002 | Haberman et al. | |
| 2003/0001846 A1 | | 1/2003 | Davis et al. | |
| 2003/0045957 A1 | | 3/2003 | Haberman et al. | |
| 2003/0142689 A1 | | 7/2003 | Haberman et al. | |
| 2004/0117257 A1 | | 6/2004 | Haberman et al. | |
| 2004/0246376 A1 | | 12/2004 | Sekiguchi et al. | |

FOREIGN PATENT DOCUMENTS

| | | |
|---|---|---|
| JP | 2001-292173 | 10/2001 |
| JP | 2001-309269 | 11/2001 |
| JP | 2001-326922 | 11/2001 |
| JP | 2003-304473 | 10/2003 |
| WO | WO 93/21636 | 10/1993 |
| WO | 98/44717 | 10/1998 |
| WO | WO 01/77776 A2 | 10/2001 |
| WO | WO 02/28102 A1 | 4/2002 |
| WO | WO 02/057959 A2 | 7/2002 |
| WO | 02/071191 | 9/2002 |

OTHER PUBLICATIONS

Inventors Listing of Prior Art, 1 page.
Mozart's Musikalisches Wuerfelspiel, A Musical Dice Game for Composing a Minuet, 1995, 3 pages.
Romance Writer, "Trouble Under the Stars," from Trivia Park, 2 pages.
StoryCraft 4.0, User Manual, 2001, pp. 1-21.
Martinez et al., "MPEG-7 The Generic Multimedia Content Description Standard, Part 1," IEEE Multimedia, Apr.-Jun. 2002, pp. 78-87.
Agamanolis, "Isis, Cabbage, and Viper: New Tools and Strategies for Designing Responsive Media," Jun. 2001, pp. 1-133.
Davis et al., "Media Streams: Video Annotation and Editing System," 2 pages.
Russ et al., "Smart Realisation: Delivering Content Smartly," Journal of the IBTE, vol. 2, Part 4, Oct.-Dec. 2001, pp. 12-17.
Gerdt et al., "StoryML: An XML Extension for Woven Stories," ITS 2002, LNCS 2363, 2002, pp. 893-902.
Gerdt et al., "Woven Stories as a Cognitive Tool," Cognitive Technology 2001, LNAI 2117, Springer-Verlag, 2001, pp. 233-247.
Gerdt et al., "Applying Computer Supported Collaborative Writing in Education," Paper 07, 2001, 10 pages.
Rehatschek et al., "A Generic Annotation Model for Video Databases," Proceedings of Visual Information and Information Systems, Third International Conference, Visual 99, Jun. 2-4, 1999, pp. 383-391.
Davis, "Media Streams: An Iconic Visual Language for Video Annotation," Telektronikk 4.93, 1993, pp. 1-30.
Day et al., "A Multi-Level Abstraction and Modeling in Video Databases," Multimedia Systems 7, 1999, pp. 409-423.
Office Action dated Sep. 21, 2007 issued in corresponding Chinese Application No. 03821664.7 with an at least partial English-language translation thereof.
Office Action dated Aug. 8, 2008 issued in corresponding Chinese Application No. 03821664.7 with an at least partial English-language translation thereof.

An at least partial English-language translation of an Office Action dated Apr. 17, 2009 issued in corresponding Japanese Application No. 2004-571920.
Office Action dated May 8, 2009 issued in corresponding Chinese Application No. 03821664.7 with an at least partial English-language translation thereof.
Office Action dated Nov. 20, 2009 issued in corresponding Chinese Application No. 03821664.7 with an at least partial English-language translation thereof.
An at least partial English-language translation of an Office Action dated Jan. 6, 2010 issued in corresponding Japanese Application No. 2004-571920.
An at least partial English-language translation of an Office Action dated Jan. 22, 2010 issued in corresponding Chinese Application No. 038216647.
Qiang Ma et al., "WebTelop: A dynamic integration and presentation system of web and broadcasting information", Information Processing Society Examination Report, Japan: Information Processing society of Japan, Jul. 17, 2002, vol. 2002, Nov. 67: pp. 169-176 with a partial English-language translation thereof.
Rehatschek, H. and Muller, H., "A Generic Annotation Model for Video Databases", Institute of Information Systems, Joanneum Research, Austria and Vrije Universiteit Amsterdam, 9 pages (undated).
Bateman et al., "InterMovie: A New Architecture for Interactive Media," Proceedings of the International Conference on Information Technology and Multimedia at UNITEN (ICIMm 2001), Aug. 15, 2001, 8 pages.
Notice of Decision of Granting Patent Right for Invention (5 pgs.) dated Mar. 3, 2011 issued in CN 03821664.7.
Sheth, et al., "Video Anywhere: A System for Searching and Managing Distributed Heterogeneous Video Assets", Large Scale Distributed Information Systems Lab, Department of Computer Science, University of Georgia, Athens, GA, SIGMOD Record, vol. 28, No. 1, Mar. 1999 (6 pgs.).
Decision of Rejection and Decision of Dismissal of Amendment (7 pgs.) issued in Japanese Application No. 2004-571920 dated Oct. 19, 2010.
Office Action (10 pgs.) dated Sep. 28, 2012 issued in Japanese Application No. 2011-041643.
Office Action (10 pgs.) dated Jul. 29, 2013 issued in Japanese Application No. 2011-041643.
Ohmata et al., "Metadata-based Environmentally-adaptive Viewing Support System for Digital Broadcasting—A Proposal", Proceedings of 64th National Convention of the Information Processing Society of Japan (2002) (5 pgs.) with an at least partial English-language translation thereof (8 pgs.).
Communication pursuant to Article 94(3) EPC issued in European Application No. 08 007 138.4 dated Feb. 10, 2014 (8 pgs.).
Request for Further Processing made to European Patent Office in European Application No. 08007138.4 dated May 29, 2009 (4 pgs.).
Communication pursuant to Rule 70(2) EPC and reference to Rule 39(1) EPC issued in European Application No. 08007138.4 dated Aug. 19, 2008 (1 pg.).
Designation as inventor—communication under Rule 19(3) EPC issued in European Application No. 08007138.4 dated Jun. 3, 2008 (1 pg.).
Extended European Search Report dated Jul. 1, 2008 issued in European Application No. 08007138.4 (8 pgs.).
Invitation to remedy deficiencies in the application documents dated Jun. 19, 2008 issued in European Application No. 08007138.4 and response (12 pgs.).
Translation of Office Action dated Sep. 28, 2012 issued in Japanese Application No. 2011-041643 (4 pgs.).
Translation of Office Action dated Jul. 29, 2013 issued in Japanese Application No. 2011-041643 (7 pgs.).
Summons to oral proceedings pursuant to Rule 115(1) EPC dated Oct. 25, 2013 and Withdrawal of Appeal dated Mar. 3, 2014 issued in European Application No. 03795095.3 (6 pgs.).
Notice of Appeal dated Aug. 8, 2008 issued in European Application No. 03 795 095.3 (1 pg.).
Grounds of Appeal dated Oct. 22, 2008 issued in European Application No. 03 795 095.3 (13 pgs.).

(56) References Cited

OTHER PUBLICATIONS

Decision of the Examining Division dated Apr. 23, 2008 issued in European Application No. 03 795 095.3 (41 pgs.).

Provision of a copy of the minutes in accordance with Rule 124(4) EPC dated Jun. 12, 2008 issued in European Application No. 03 795 095.3 (4 pgs.).

Communication to the European Patent Office dated Apr. 10, 2008 in European Application No. 03 795 095.3 (11 pgs.).

Result of consultation dated Apr. 10, 2008 issued in European Application No. 03 795 095.3 (3 pgs.).

Communication to the European Patent Office dated Mar. 11, 2008 in European Application No. 03 795 095.3 (13 pgs.).

Summons to attend oral proceedings pursuant to Rule 71(1) EPC dated Nov. 20, 2007 issued in European Application No. 03 795 095.3 (6 pgs.).

Communication to the European Patent Office dated Aug. 18, 2006 in European Application No. 03 795 095.3 (16 pgs.).

Communication pursuant to Article 96(2) EPC dated Oct. 28, 2005 issued in European Application No. 03 795 095.3 (6 pgs.).

Translation of Office Action (6 pgs.) issued in corresponding Japanese Application No. 2007-504460.

\* cited by examiner

Fig.3.

| Media Element ID | 0.53 | | |
|---|---|---|---|
| Media | URI | file://c:/media/AvB/0.53.avi | |
| | Format | windowsmedia | |
| | Position | In | 65:05 |
| | | Out | 65:35 |
| Structural | Description | Team B Goal 2 | |
| | Event | Nature | Goal |
| | | Performer | Paulo Di Canio |
| | | Recipient | Fabien Barthez |
| Domain Specific | Teams | Home Team | Team A |
| | | Away Team | Team B |
| | Performer Allegiance | Team A | |
| | Recipient Allegiance | Team B | |
| Conceptual | Interest Value | 0.7 | |
| | Rating | PG | |
| Relationship | Sequence ID | 1.4 | |
| | Sequence Location | 2 | |
| | Cause Object ID | CO1 | |

Fig.3B.

| Cause Object ID | CO1 | |
|---|---|---|
| Relationship | ID of caused media element(s) | 0.53 |
| | ID of causal media element(s) | 0.52 |

Fig.6.

| Title | Football Goal Highlights Template | |
|---|---|---|
| Section | Name | Intro |
| | Query | URI contains " Football Intro" |
| Section | Name | Main |
| | Query | (Team is "!Profile(Profile/Sports/Team)") AND (Action is "Goal") |
| | Constraint | Target Duration = 150s |
| Section | Name | Outro |
| | Query | URI contains "outro" |

Fig.7.

| Name | John Talbot | | |
|---|---|---|---|
| Sports | Football | Team | Team B |
| | | Player | Paulo Di Canio |
| | | Player | Trevor Sinclair |
| | Cricket | Team | Essex |
| | | Player | Nasser Hussain |
| Films | Actor / Actress | Milla Jovovich | |
| | | Jimmy Nail | |

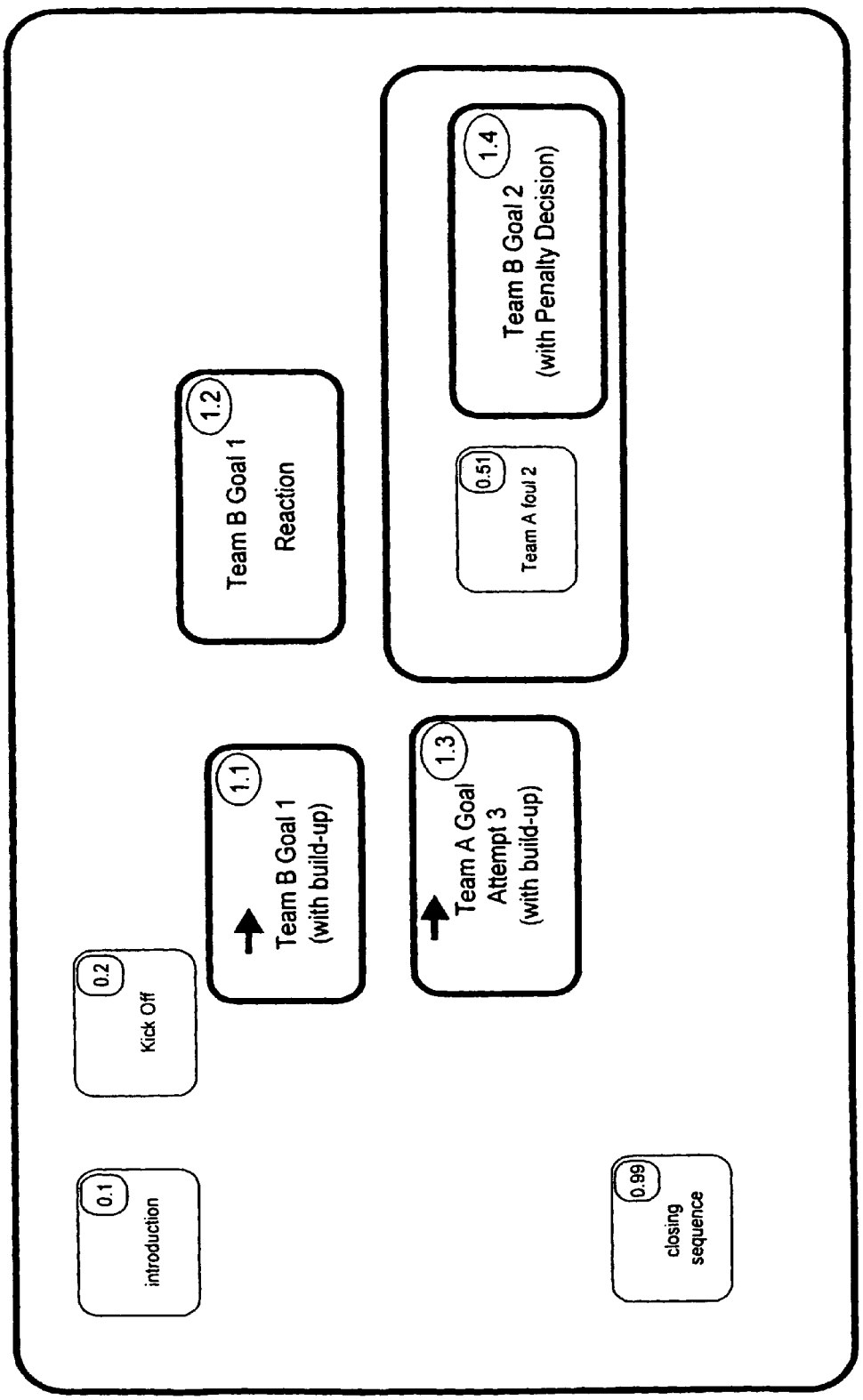

Fig.11.

| AvB Highlights | file://c:/media/intro.avi |
| --- | --- |
| | file://c:/media/AvB/010.avi |
| | file://c:/media/AvB/011.avi |
| | file://c:/media/AvB/012.avi |
| | file://c:/media/AvB/052.avi |
| | file://c:/media/AvB/053.avi |
| | file://c:/media/outro.avi |

Fig. 14.

| Title | Duration | Description | Actors | Place | NarrativeFramew... | PlotValue | |
|---|---|---|---|---|---|---|---|
| JKY 08b | 28.56 | | Jacky | Paper Mill | | 0.0 | ✓ Thumbnail |
| JKY 09a | 10.40 | | Jacky | Paper Mill | | 0.0 | ✓ Creation_Title |
| JKY 09b | 21.96 | | Jacky | Paper Mill | | 0.0 | Creation_Classification |
| JKY 10a | 6.60 | | Jacky | Paper Mill | | 0.0 | Creation_Creator |
| JKY 10b | 22.40 | | Jacky | Paper Mill | | 0.0 | Creation_Date |
| JKY 11 | 5.56 | | Jacky | Paper Mill | | 0.0 | Creation_ValidFrom |
| PPL 01 | 3.84 | | Unattributed person | By the canal | | 0.0 | Creation_ValidTo |
| PPL 02 | 5.96 | | Unattributed person | By the canal | | 0.0 | Media_URI |
| PPL 03 | 2.64 | | Unattributed person | Sainsbury | | 0.0 | ✓ Media_Duration |
| PPL 04 | 1.32 | | Unattributed person | Sainsbury | | 0.0 | ✓ Structural_Description |
| PPL 05 | 5.32 | | Unattributed person | Sainsbury | | 0.0 | ✓ Structural_Actors |
| PPL 06 | 6.44 | | Unattributed person | Sainsbury | | 0.0 | Structural_Artefacts |
|  |  |  |  |  |  |  | ✓ Structural_Location_Place |
|  |  |  |  |  |  |  | Structural_Location_Nature |
|  |  |  |  |  |  |  | Structural_Location_Time |
|  |  |  |  |  |  |  | Structural_Dialogue |
|  |  |  |  |  |  |  | Structural_Action |
|  |  |  |  |  |  |  | Structural_FOV |
|  |  |  |  |  |  |  | Conceptual_Pace |
|  |  |  |  |  |  |  | Conceptual_Style |
|  |  |  |  |  |  |  | Conceptual_Rating |
|  |  |  |  |  |  |  | ✓ Conceptual_NarrativeFramew |
|  |  |  |  |  |  |  | ✓ Conceptual_PlotValue |
|  |  |  |  |  |  |  | Conceptual_AestheticValue |

AUTOMATIC MEDIA ARTICLE COMPOSITION USING PREVIOUSLY WRITTEN AND RECORDED MEDIA OBJECT RELATIONSHIP DATA

This application is the US national phase of international application PCT/GB2003/003976 filed 15 Sep. 2003 which designated the U.S. and claims benefit of GB 0221328.8, dated 13 Sep. 2002 and GB 0307859.9, dated 4 Apr. 2003, the entire content of which is hereby incorporated by reference.

BACKGROUND

1. Technical Field

The present invention relates to a method of, and apparatus for, composing a media article.

2. Related Art

Media articles portray content (whether real, imagined or computer-generated) to a person's senses. Media articles can be presented to a person via a variety of media, including text, voice, sound, pictures or moving images.

As recording technologies have improved, the amount of recorded media articles available to a consumer has grown rapidly. Media articles are often recorded in media files (note that although the plural 'media' is used here, 'media file' is to be understood to include both files which are intended to be conveyed to user by only one medium—e.g. text or speech and also 'multimedia' files whose meaning is conveyed by a plurality of media). The Internet is the most recent communications network to emerge and provides worldwide transmission of recorded digital media files representing text, sound, pictures, moving images or a combination of these. Since the number of media files accessible via the internet is so large, there is a need to label media files with some description of what they contain. Thus, for example, HTML (Hyper-Text Mark-up Language) files contain 'meta' tags which include keywords which indicate what subjects are covered in the web-page presented to the user.

Labelling media files with metadata is made more beneficial when a group of users agree on how that metadata should be structured and the elements it should contain. Often, XML (eXtensible Mark-up Language) is used to define such structure and the elements contained within that structure. In effect, XML can be used to define metadata 'languages'. One example of such a metadata 'language' is StoryML, as discussed in "StoryML: An XML Extension for Woven Stories" by P. Gerdt et al, pp 893 to 902 of the proceedings of the Intelligent Tutoring Systems conference 2002. StoryML is a metadata language designed to describe a contribution to a collaboratively written story. As such it includes elements giving the author of the contribution and the contributions relationship to other contributions.

A proposal for adding metadata to video files (the 'Multimedia Content Description Interface' more widely known as MPEG-7) is being discussed by the Moving Pictures Expert Group.

International Patent application WO 02/057959 discloses computer software providing a user with a tool to organise media files. Various metadata can be associated with those files. The files and the metadata are stored in a 'relational' database—note that 'relational' as used in the expression relational database has little to do with relations between the database entries or what is represented in those entries—instead it refers to a 'relation' in the sense that word is used in mathematical set theory.

One method of composing a media article involves the putting together of a plurality of components. For example, a film is made up of a plurality of scenes as set out in a screenplay. There have been some attempts to create a media article automatically in this way. For example, the production of a Waltz in accordance with a musical dice game has been provided. Similarly, an automatic story generation program, the Romance Writer is available.

BRIEF SUMMARY

According to a first aspect of the present invention, there is provided a method of automatically composing a media article comprising:

analysing digital metadata associated with a first set of stored media data, which digital metadata includes:

related set identity data identifying a second set of stored media data; and relationship data which indicates the relationship between what is represented by the first set of stored media data and what is represented by the second set of stored media data; and arranging said first and second sets of stored media data in a media article in accordance with said analysis.

By analysing digital data associated with a first set of stored media data, which digital data includes an identifier of a second set of stored media data and an indication of the relationship between what is represented by the first set and what is represented by the second set, and arranging the first and second sets of stored media data in a media article in accordance with said analysis, a method of composing a media article is provided which obviates the need for another source of sequencing information to be provided at the time the media article is composed.

The expression 'set of stored media data' includes media data files, streams, or a set of pointers into a file or database.

Digital sets of stored media data are stored in a variety of formats. The expression set of stored media data is not intended to be limited to any particular format and so includes, for example, a file which merely contains data on the position of components seen by a user when playing a computer game—the data in that file subsequently being processed by rendering software to generate an image for display to the user.

In some embodiments, said method further comprises generating said set identity data and said relationship data.

Preferably, said metadata further comprises content data indicating what is represented by said sets of stored media data, said method further comprising the step of selecting, from a plurality of sets of stored media data, one or more sets of stored media data in dependence upon said content data, said one or more sets including said first and second sets of stored media data.

This combination of a) searching to provide a plurality of potential components for a media article, or part of a media article; and b) subsequently arranging a plurality of the selected components in accordance with metadata associated with those components allows the automatic composition of media articles directed towards a particular theme more easily than has hitherto been possible.

Preferably, the method further comprises making a plurality of such selections; and concatenating the results of said selections.

This allows an approach to the composition of a media article which broadly follows an established pattern, but which allows a degree of flexibility within that pattern not seen in conventional systems. Thus the type of broad pattern known for narratives and films—for example, the Story-Craft® program from StoryCraft Corporation, 560 Roland Drive, Norfolk, Va. 23509, USA helps an author write a story by asking the writer to introduce the hero and an antagonist, prior to some conflict between them, which is then followed by the hero's triumphal return home—can still be used, but variations within that pattern can easily be introduced by changing the nature of the selection.

This will allow, for example, the cost effective creation of different versions of a film or computer game, conforming to different artistic or qualitative ambitions, whilst still retaining subjectively high standards of narrative, motion and audio continuity.

According to a second aspect of the present invention, there is provided a media article composition apparatus comprising:

one or more memory devices storing, for each of a plurality of sets of stored media data, metadata including relationship data indicating one or more relationships between the content represented in said set of stored media data and the content represented in one or more other sets of stored media data; and one or more processors in communication with said one or more memory devices and arranged in operation to compose a media article by arranging said sets of stored media data or identifiers thereof in accordance with said relationship data.

In preferred embodiments, an object-oriented database is used to store objects containing metadata associated with a set of stored media data identified by said metadata. Relationship metadata can then be represented by relationships between objects in the object-oriented database.

The sets of media data might alternatively be stored in a file system.

BRIEF DESCRIPTION OF THE DRAWINGS

By way of example only, specific embodiments of the present invention will now be described with reference to the accompanying Figures in which:

FIG. 3 shows metadata associated with a media element following the use of the media mark-up tool of FIG. 2;

FIG. 3B shows a cause object stored in the object-oriented database of FIG. 2;

FIGS. 4A to 4G show how an editor builds the relationship data included in the metadata of FIG. 3;

FIG. 6 shows template data generated using the template creation tool of FIG. 2;

FIG. 7 shows user profile data generated using the user profile creation tool of FIG. 2;

FIG. 11 shows an edit decision list as might be produced by the template populator module;

FIG. 14 shows an additional sub-window which opens on the user selecting one of the media bins;

DETAILED DESCRIPTION OF THE EXEMPLARY EMBODIMENTS

Figure 1:
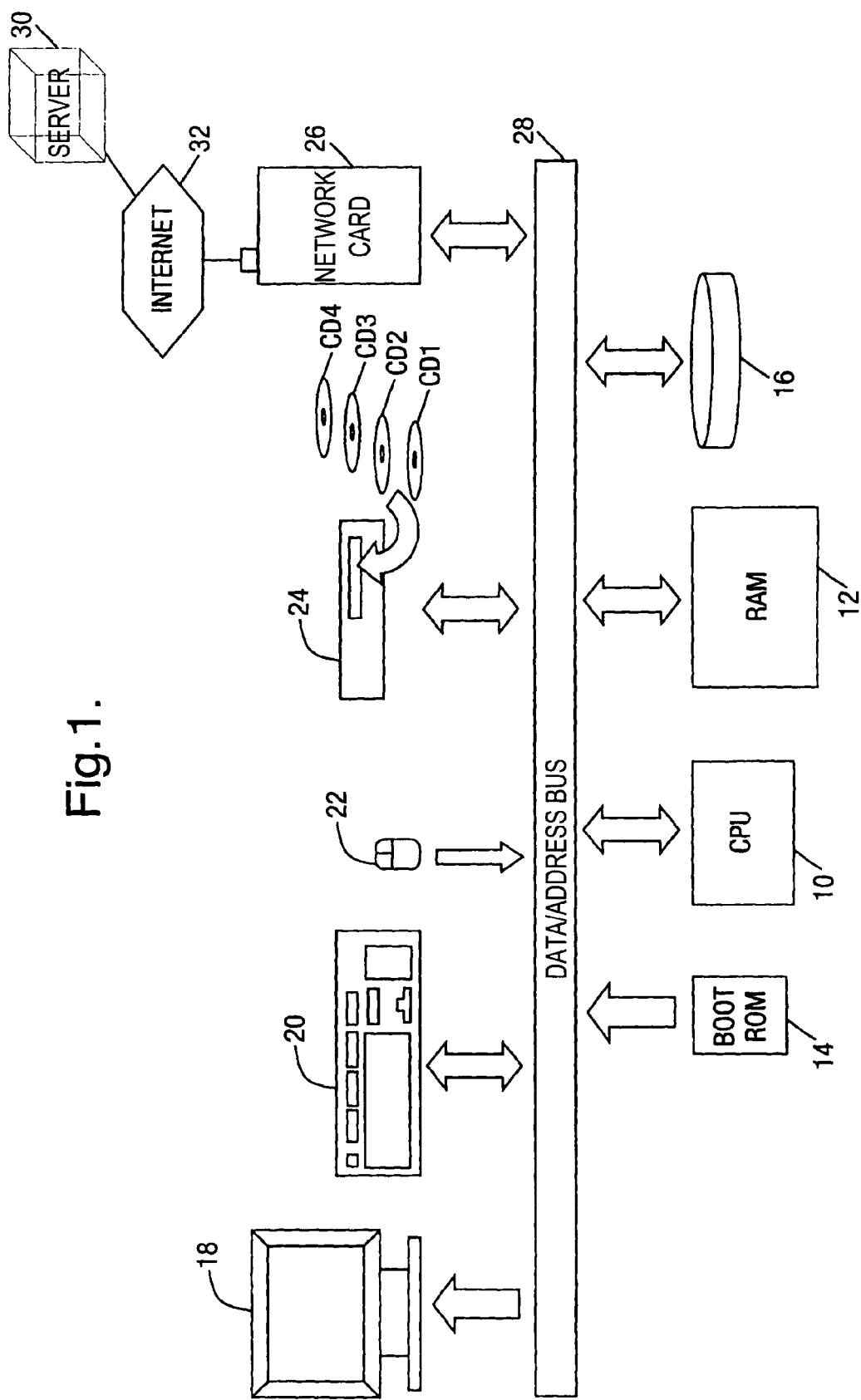
FIG. 1 is a schematic illustration of components of a personal computer which may be operated to provide a media assembly system in accordance with a first embodiment of the present invention.

FIG. 1 shows a personal computer which comprises well-known hardware components connected together in a conventional manner. The well-known hardware components comprise a central processing unit 10, random access memory 12, read-only memory 14, a hard disk 16 and input/output devices 18,20,22,24, and 26. The hardware components are interconnected via one or more data and address buses 28. The input/output devices comprise a monitor 18, a keyboard 20, a mouse 22, a CD ROM drive 24 and a network card 26. The network card is connected to a server computer 30 by the public Internet 32.

Figure 2:
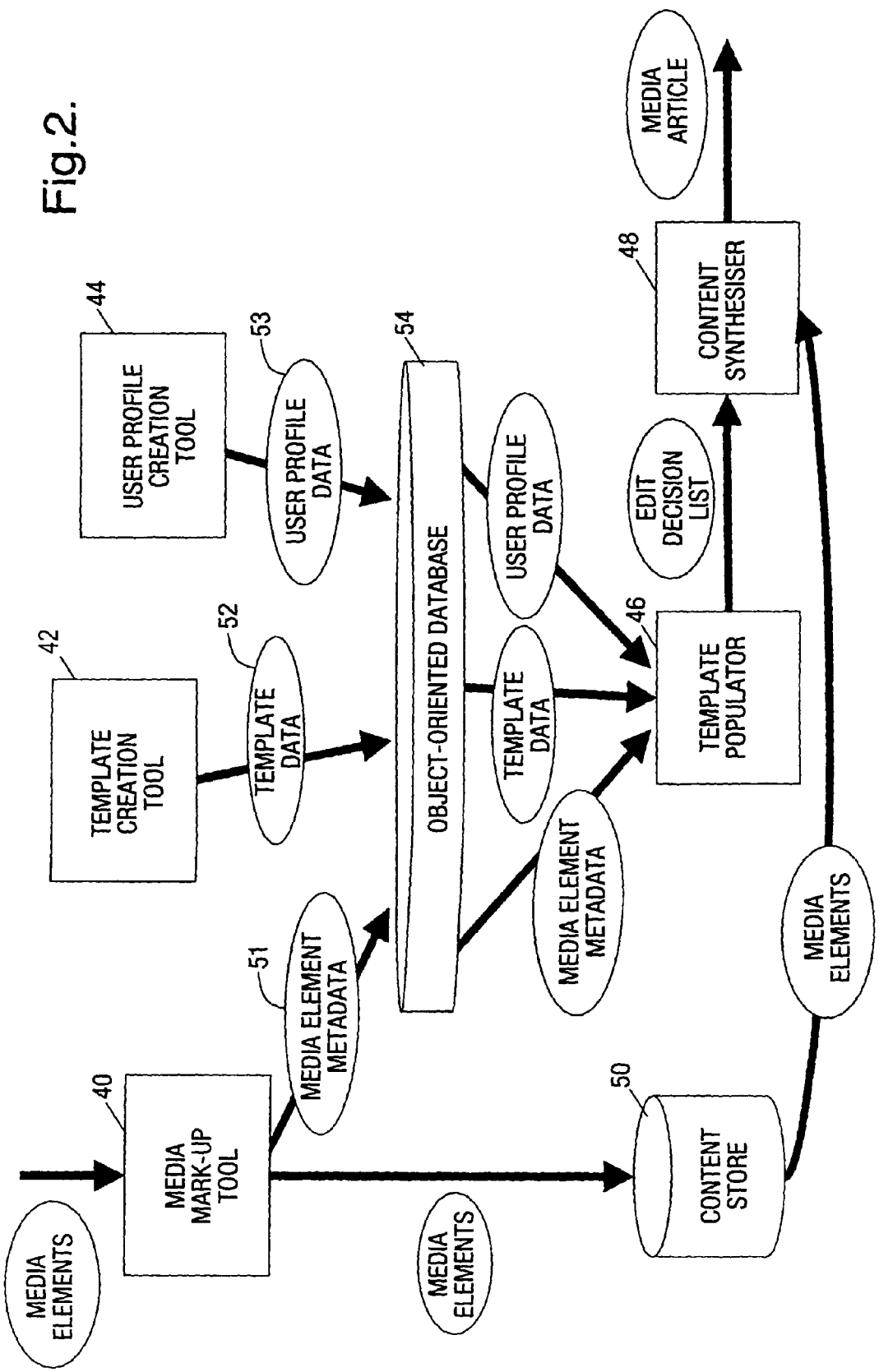
FIG. 2 is a diagram of the architecture of a computer program used in controlling the personal computer of FIG. 1 in accordance with a first embodiment of the present invention.

FIG. 2 shows the software and data components of a system according to a first embodiment of the present invention. The software includes three input program modules, namely a media mark-up tool program 40, a template creation tool program 42, a user profile creation tool program 44, object-oriented database management software 54, and two output program modules, namely a template populator program module 46 and a content synthesis program module 48.

The system also includes two stores for the persistent storage of data. The first of these is a content store 50 which comprises a number of media files stored on the hard disk 16 using the file system provided by the computer's operating system program. The second store for the persistent storage of data comprises an object-oriented database 54 known as ObjectStore® supplied by Excelon Corporation, Burlington, Mass. The database stores three different categories of objects, namely media objects 51 (each of which includes metadata describing one of the media files stored in the content store 50), template objects 52 and user profile objects 53. The objects in the database are again stored on the hard disk 16 of the computer. Persistent storage for the object-oriented database and/or the content store might, instead of the hard disk, be provided by removable data carriers such as DVDs, CDs, CD-ROMs or on different computers (accessed for example via a URI) accessible via a network connection such as is provided by the network card 26.

The three input program modules control the computer (FIG. 1) to provide a user interface allowing the generation of objects which include data structures constructed in accordance with predetermined structured data models. This increases the ease with which different program modules can exchange data. Where the structured data model is made public, different parties can write different components of the program which are nevertheless able to exchange data with one another. Also, objects created by one editor can be used by another editor working at a different location or at a later time.

In the present embodiment, the three input program modules offer the following functionality:

The media mark-up tool provides an interface for a editor to update the content store 50 and the object-oriented database 54. In practice it is envisaged that an editor using the present embodiment will have access to media elements generated by other editors, rushes from various sources, sections of prepared programmes, still photographs and various other pieces of media (all represented in electronic form) at his disposal. These media elements are stored in an appropriate directory structure in the content store. Each directory is known as a 'bin' in the art—a reference to the labelled bins in which rolls of film relating to a particular project are stored.

Media elements are often recorded digitally in a file which may contain a number of elements in a linear stream. Such a file may therefore contain one or more media elements associated with it. The media mark-up tool allows the editor to preview files and, where there are to be several media elements within that file, set start and end points defining the scope of each media element within the file. If there is only one media element associated with the file then the start point is simply zero and the end point is the length (duration) of the media. In this way, a editor is able to generate a plurality of files, each forming one media element. The editor gives a name to each file at the time he defines the start and end points of the media element.

However, for the purposes of the present description, it is assumed that the editor begins only with a file that includes an electronic representation of unedited film recorded at a football match and introduction sequences for a football programme etc. An unedited piece of film is known as a 'rush' in the art. Using the media mark-up tool 40, the editor might select various sections of the rush and store each as a media element in a shorter file in a directory in the content store 50.

The media mark-up tool also provides a tool enabling the editor to generate or edit metadata for media elements stored in the content store 50. The tool stores this metadata as an object in the object-oriented database 54.

Figure 4A:
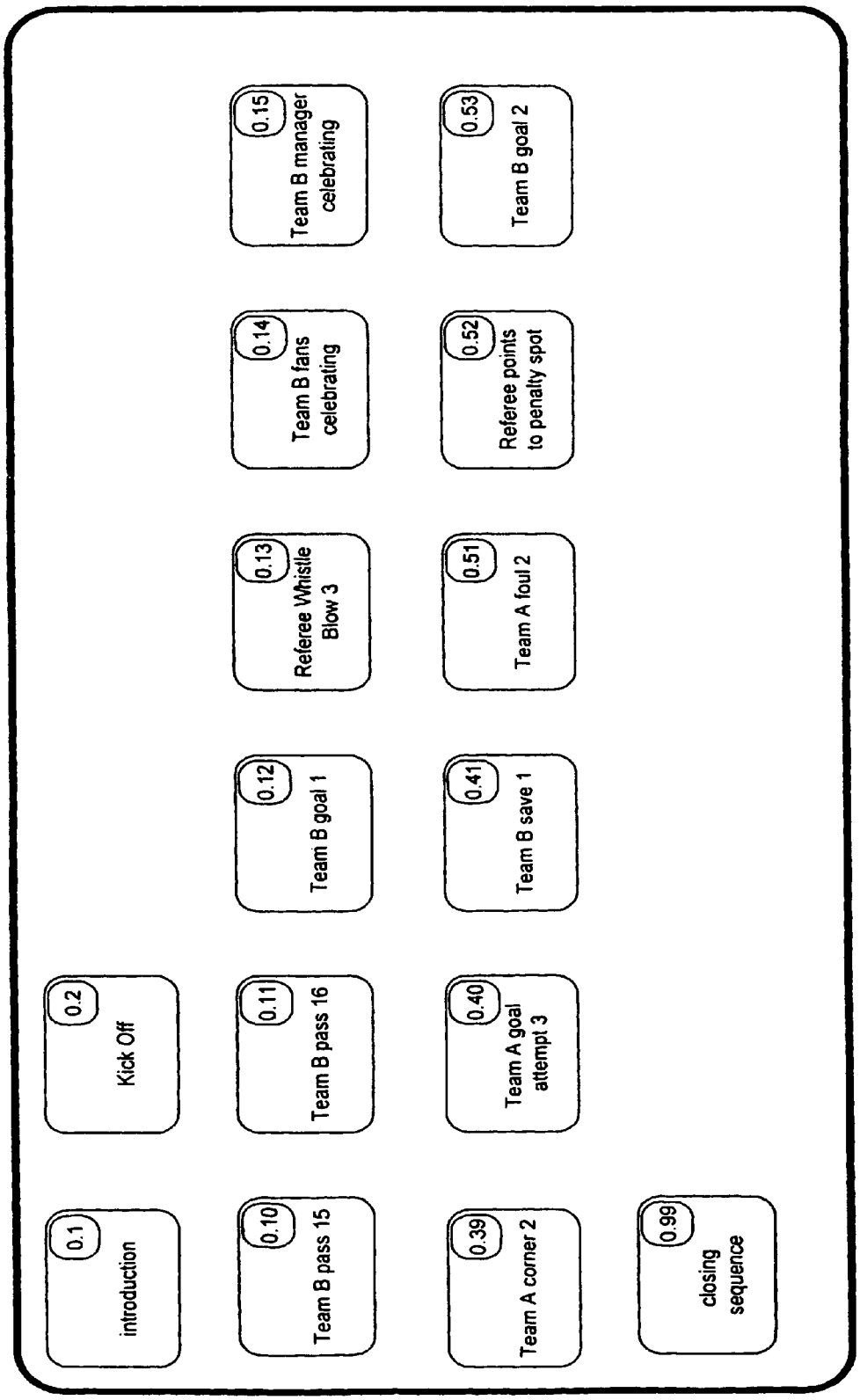
Figure 4B:
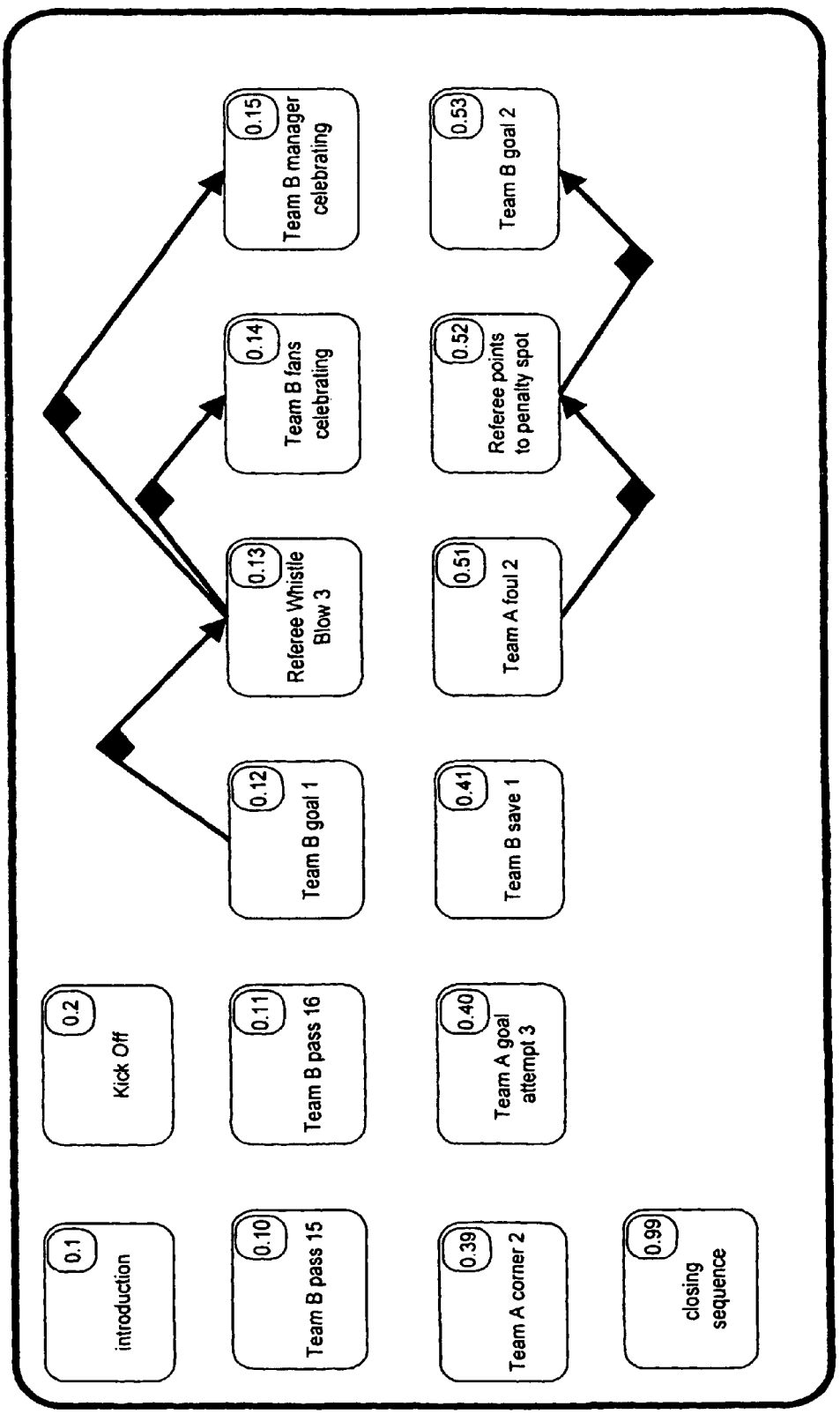

On selecting a directory within the content store, the editor is provided with a graphical user interface which presents set of icons (FIG. 4A), each of which represents one of the media elements held in that directory. These icons may just be a still from a video sequence contained within the file, for example. In the examples below, they are illustrated as boxes which include the media element identifier entered by the editor in the top right-hand corner and which contain a description of what occurs in the media element in the centre of the box. The user interface allows the editor to select the media elements using the mouse 22 and to move the media elements around the screen using the mouse.

Having selected one of the media elements, the editor enters metadata to be associated with that media element in two stages. In a first stage, the editor can double-click on one of the pictures to bring up a form onto which the values of the parameters included within the schema can be entered.

An example of the metadata generated in the first stage is shown in the second to twelfth row of FIG. 3 (the information in the first row having been generated when the editor gave a media element identifier to the file).

It will be realised that the metadata is arranged in accordance with a structured data model. In each row, the entry at the rightmost column represents the value of a property which is input by the user. The structured data model may provide that a plurality of properties should be labelled as members of a unit at a first level of aggregation—here referred to as a set of properties (column second from the left in those rows which have four columns). The structured data model may also provide that a plurality of sets should be labelled as members of a unit at a second level of aggregation—here referred to as a superset of properties (leftmost column in those rows which have three or four columns). Those skilled in the art will realise that further levels of aggregation might be provided.

The hierarchical arrangement is influenced by the Multimedia Content Description Interface mentioned above. The intention is not to enforce usage of a complete data model across all possible applications, but to enable re-use of content within the subject domain of a production company or a specific set of projects (eg. wildlife documentaries). The data model provided is intended to provide a maximal set of elements and an interface which assists their use and the vocabularies which can be applied to them.

The metadata includes a variable number of parameters (but must nevertheless conform with the predetermined structured data model). In the example, shown in FIG. 3, the editor has entered values for 18 properties. These include:

i) Media Element ID—this identifies the media element—in the present example, the editor has given it a numerical value of 0.xx, where xx reflects the position of the media element within the original rush;

This is followed by a 'Media' superset which comprises two properties and a 'Position' set of properties. The two properties are:

ii) URI—the Universal Resource Identifier of the file which contains the media element;

iii) Format—this gives an indication of the format of the data making up the file;

The 'Position' set contains two properties as follows:

iv) In—an indication of the time elapsed since the start of the rush at the start of the media element;

v) Out—an indication of the time elapsed since the start of the rush at the start of the media element;

The 'Media' superset is followed by a superset of four 'structural' properties. That superset begins with vi) Description—a description of the content of the file;

which are followed by another set (called 'Event') which contains three properties:

vii) Nature—the type of event that is seen in the video sequence recorded in this file;

viii) Performer—the person performing the principal action of the event;

ix) Recipient—the person subject to the principal action of the event;

These properties are followed by a domain-specific superset of properties which are only sensibly applied to media elements which relate to material obtained from two-sided sporting events;

The first two properties belong to a set (called 'Teams') of two properties:

x) Home Team—the name of the team playing on their home ground during the football match featured in the original rush;

xi) Away Team—the name of the other football team in the football match featured in the original rush;

This set is followed by the two properties:

xii) Performer Allegiance—the side (if any) to which the performer owes allegiance;

xiii) Recipient Allegiance—the side (if any) to which the recipient owes allegiance;

These two properties are followed by a set (named 'conceptual') containing two properties:

xiv) Interest Value—this value, between 0 and 1 indicates how significant the editor considers this media element to be; and xv) Rating—this value indicates the suitability of the media element for showing to people based on an age criterion—in a similar way to the classification given to films.

Once the editor has entered this data, the picture is replaced with the description of the media element given as the value of the 'description' property above. The form is then removed from the display to return to the display of a plurality of pictures representing the media elements selected by the editor from the original rush (e.g., see the kickoff media element 0.2 in FIG. 4A).

The media element metadata is then stored as a media object in the object-oriented database 54.

The second stage of the metadata creation which generates one or more 'Relationship' properties will now be described in relation to FIGS. 4A to 4H. The user is provided with a graphical user interface, allowing him to indicate relationship properties between media elements by moving and clicking on icons representing those media elements on the screen 18 of the PC (FIG. 1).

One relationship which the editor may indicate is a causal relationship. To do this, the editor clicks on a button element presented on the screen (not shown), which changes the form of the cursor. Thereafter the user moves the cursor to an media element which he judges to be a cause of another media element. He then clicks on the media element to identify it as a causal media element and moves the cursor to the media element which represents the effect of that cause and clicks again. Once he has done this, an arrow is drawn from the first media element to a diamond shape representing a cause object and then a second arrow is drawn from the diamond to a second media element. An editor may wish to make a causal association of this type when he considers that a viewer seeing the media element representing the effect would also wish to see the cause. In the example shown in FIG. 4B, the editor has indicated that:

i) media element 0.13 is caused by media element 0.12, and that both media element 0.14 and 0.15 are caused by media element 0.13; and ii) media element 0.53 is caused by media element 0.52 which is in turn caused by media element 0.51.

In response to the input of a causal association, a cause object (FIG. 3B) having its own media element identifier is added to the object-oriented database 54. The metadata associated with the media element representing the effect is updated to include a parameter indicating the media element identifier of the cause object. In more detail, the media object has a linked list of pointers to any cause object which causes it or is effected by it. Cause objects also hold two lists of pointers back to the media objects with which they are associated.

An example is seen in the last parameter shown in FIG. 3. The cause object also includes metadata indicating the media element identifier which causes the effect.

Several different media objects might cause the same effect (e.g. a hero could die because he was poisoned, or because he was crushed to death) and there can be several different effects from a cause (e.g. because of the hero's death, the evil queen lived undefeated until the ripe old age of 103, and the broken-hearted princess made a vow of celibacy and became a nun). It is for this reason that a cause-effect relationship is represented using a cause object.

A second type of relationship that the editor may indicate is that of sequence. To indicate such a relationship, the editor arranges the media elements he wishes to group into the same rectangular area of the screen, ordering them from left-to-right in accordance with the sequence they should follow, clicks on a further button (not shown), which causes the cursor to change form and moves the cursor to a position to one corner of that rectangular area. Thereafter, the editor clicks the button on the mouse 22, and holds that button down whilst moving to an opposite corner of that rectangular area whereupon he releases the button. This results in a thick, solid rectangular line being drawn around the media elements contained within the rectangular area with a thick, short arrow being drawn in the top left-hand corner of the area defined by the rectangular line. In the example in FIG. 4C, the editor has indicated that the media element 0.11 representing Team B's fifteenth pass is followed by the media element representing Team B's sixteenth pass which is in turn followed by the media element representing Team B's first goal.

An editor might wish to indicate a sequential relationship of this nature where he feels that the media elements should be shown in the indicated order (if more than one of the media elements are selected by the template populator module). Media elements showing gardening at different times of year, for example, might be arranged into a sequence so that an element representing the garden in spring precedes an element representing the garden in summer and so on.

Figure 4C:
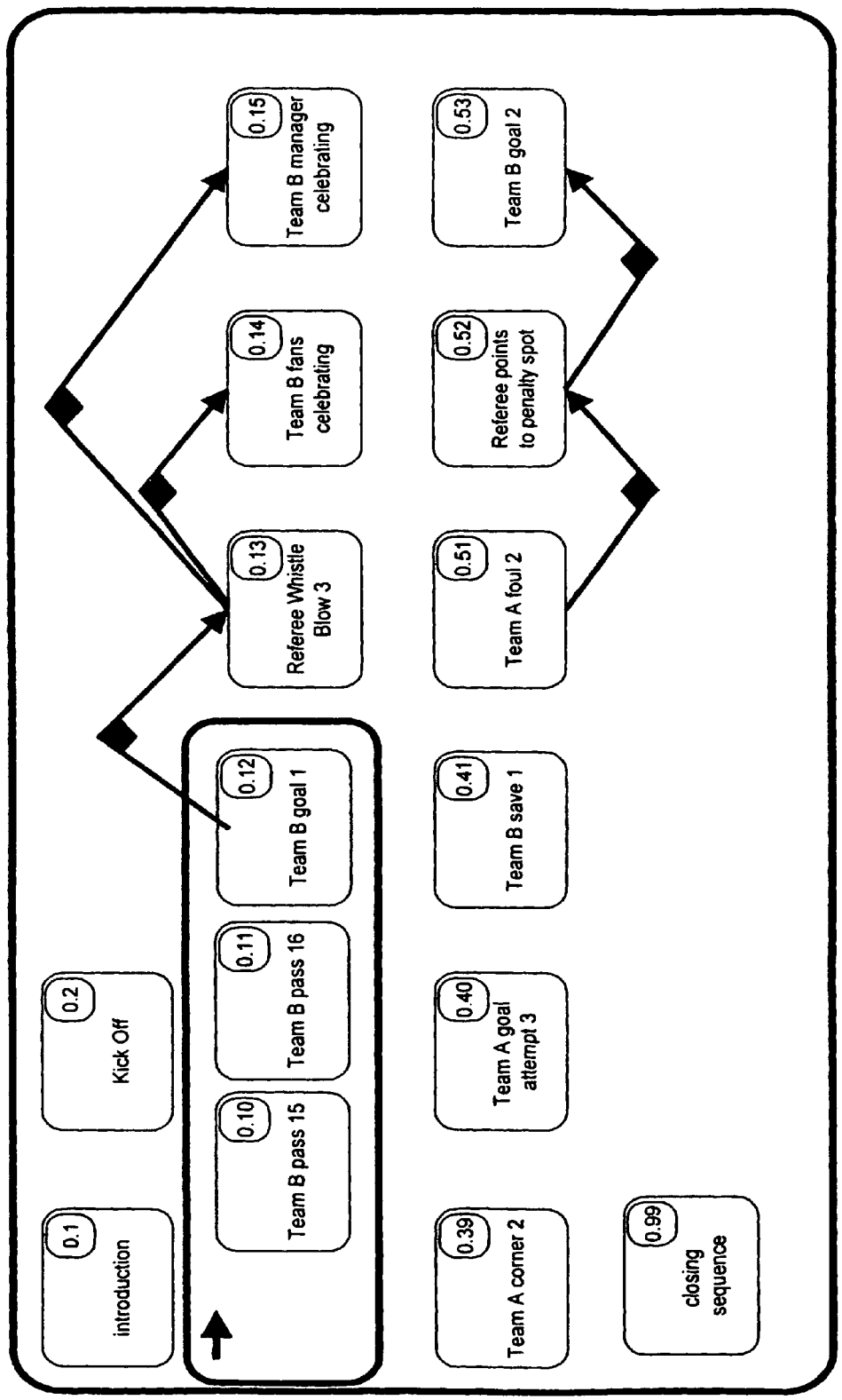

On creation of a sequence in this way, a sequence object is created in the object-oriented database as a container object containing the media objects associated with the media elements included within the sequence. As will be seen below, it is possible to generate a sequence which itself includes sequences. This hierarchical property is reflected in the first number in the identifier attributed to the sequence. Where the sequence includes only individual media elements, then the sequence identifier is of the form 1.x where x is simply incremented at each time a new sequence or group (explained below) at the first level of the hierarchy is formed. Hence the sequence shown in FIG. 4C is given the identifier 1.1.

The media object (i.e. metadata) associated with each media element in the sequence as the position of the media element within that sequence added to it. The object-oriented database also records the fact that each media object is a child of (i.e. is included within) the newly created sequence object. An example of the sequence position metadata can be seen in the penultimate row of FIG. 3.

In this embodiment, there is no metadata giving a description of groups or sequences, but here could be—such metadata might, for example, be entered by right clicking, selecting properties and entering text in the description field of the resulting dialog.

The third type of relationship an editor may wish to indicate between media elements is that of membership of a group. An editor might do this where he wishes to indicate that in a plurality of the media elements in the group are selected, then they should be shown together. A group is formed in the same way as a sequence, save for the order of the media elements on the screen being inconsequential and the editor clicking on a third button (not shown) representing a group prior to defining the rectangular area which contains the media elements to be included in the group.

This action creates a group object, a container object which contains the media objects associated with the media elements within the group. Group objects are also stored within the object-oriented database 54.

Figure 4D:
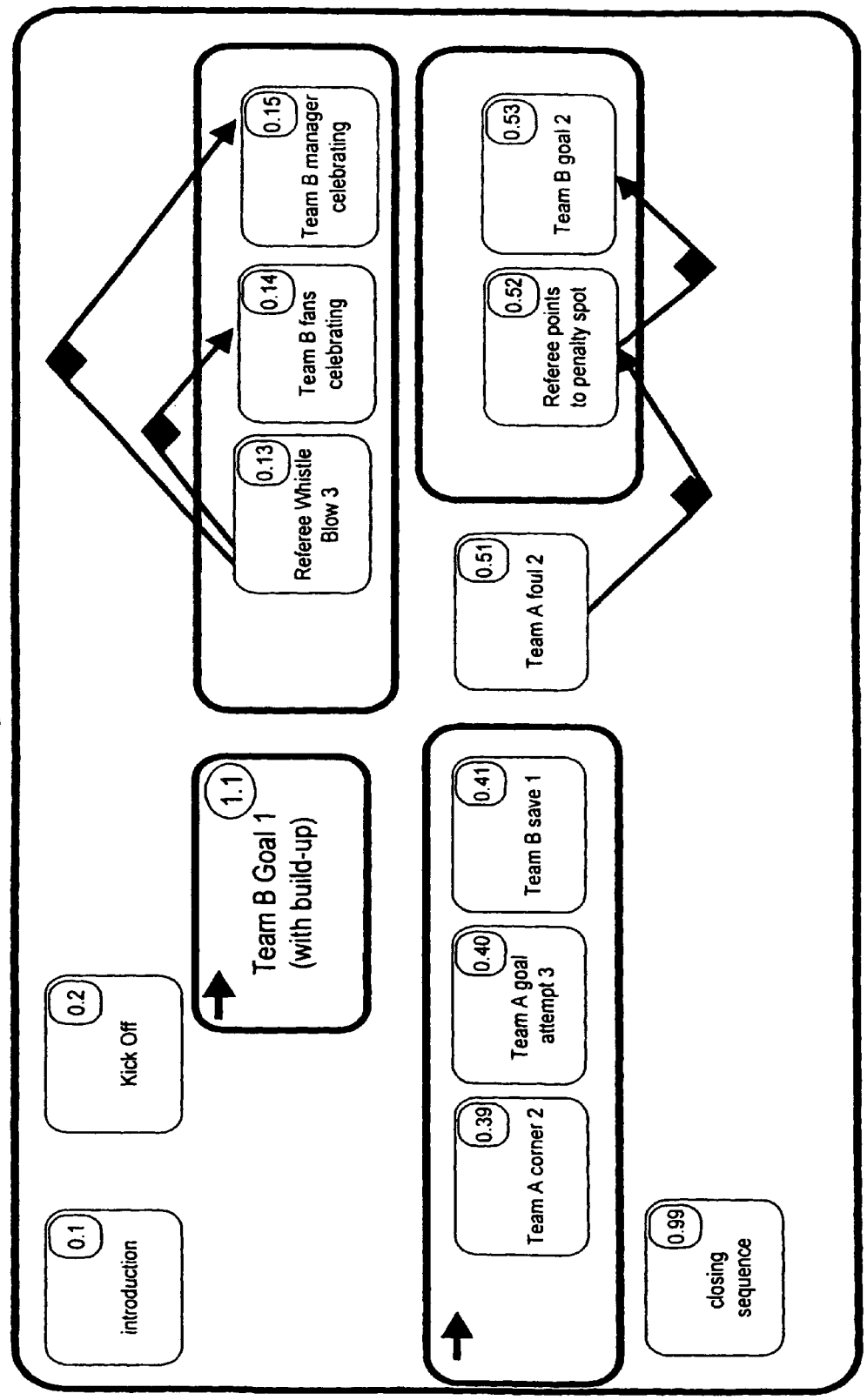

FIG. 4D shows the display seen by a editor after he has formed media elements 0.13, 0.14 and 0.15 into a first-level group 1.2, 0.39, 0.40 and 0.41 into a second first-level sequence 1.3, media elements 0.52 and 0.53 into a second first-level group 1.4.

FIG. 4E shows the editor joining the media element 0.51 and the third first-level sequence 1.4 into a second-level group 2.1. This creates another group object in the database, which is a container object for another group object. In this way a hierarchy of container objects can be built up in the object-oriented database 54.

Figure 4F:
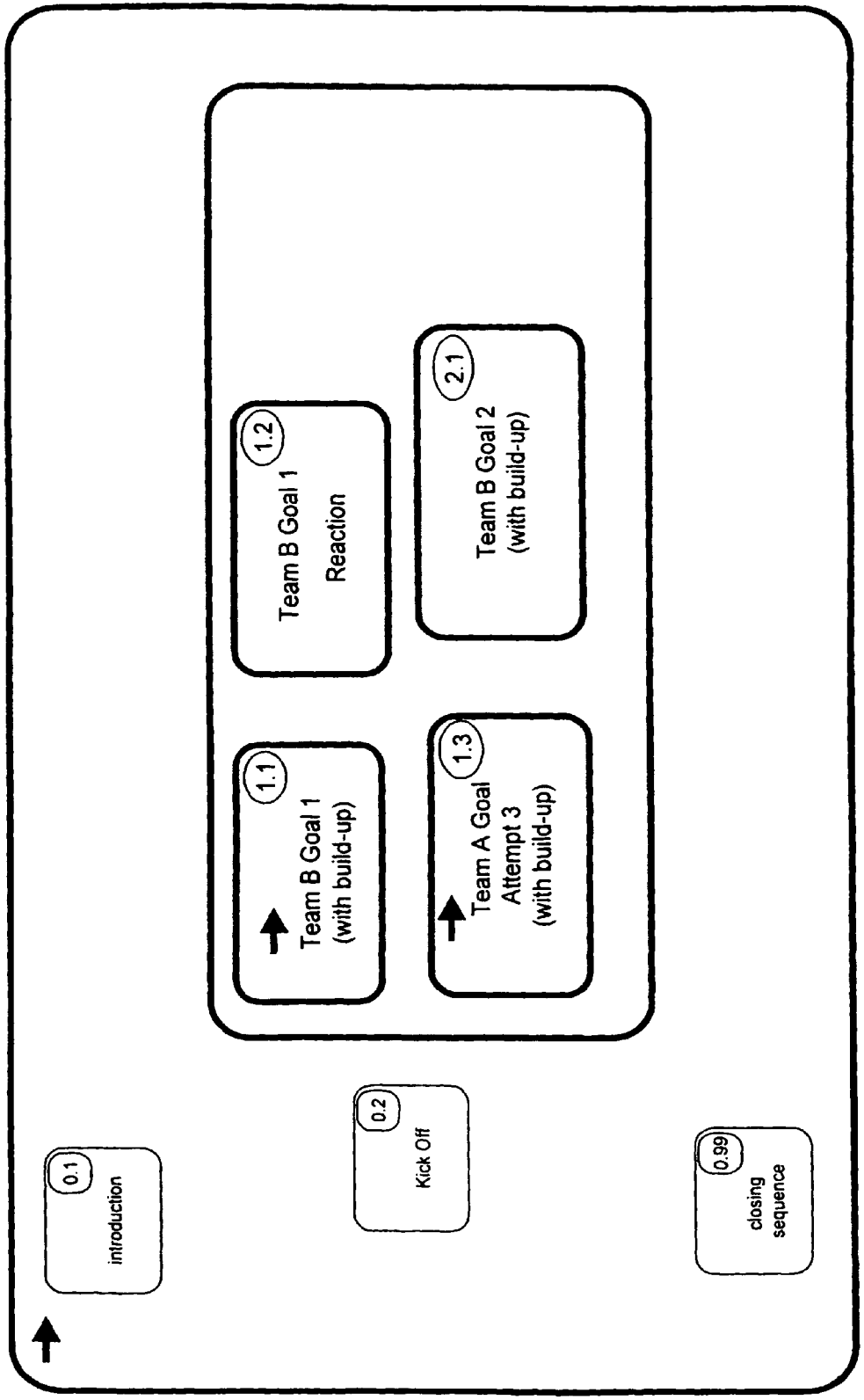

FIG. 4F shows the editor placing the two first-level sequences 1.1 and 1.3, the first-level group 1.2 and the second-level group 2.1 into a third-level group 3.1.

Figure 4G:
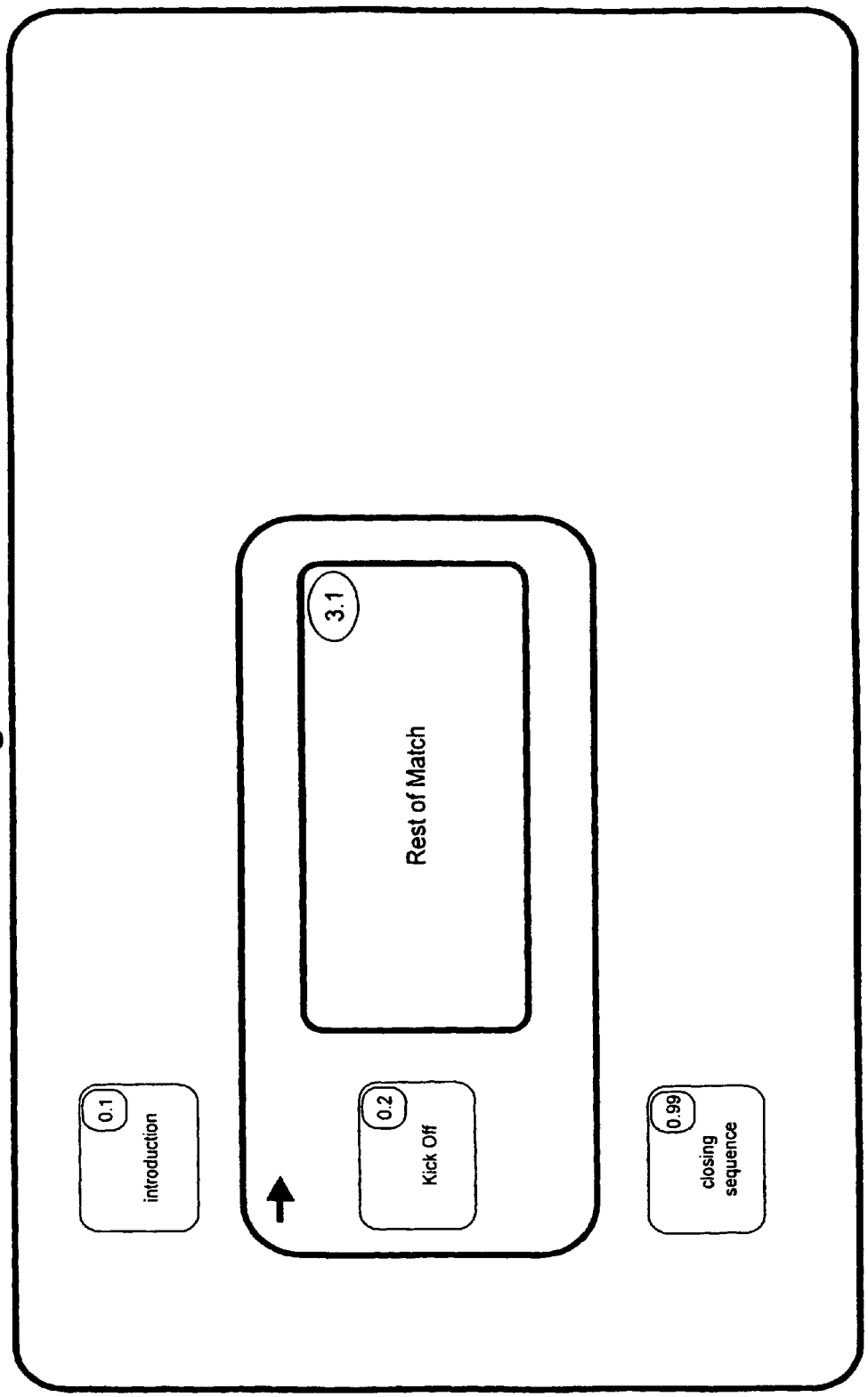

FIG. 4G shows the editor defining a fourth-level sequence.

Figure 5:
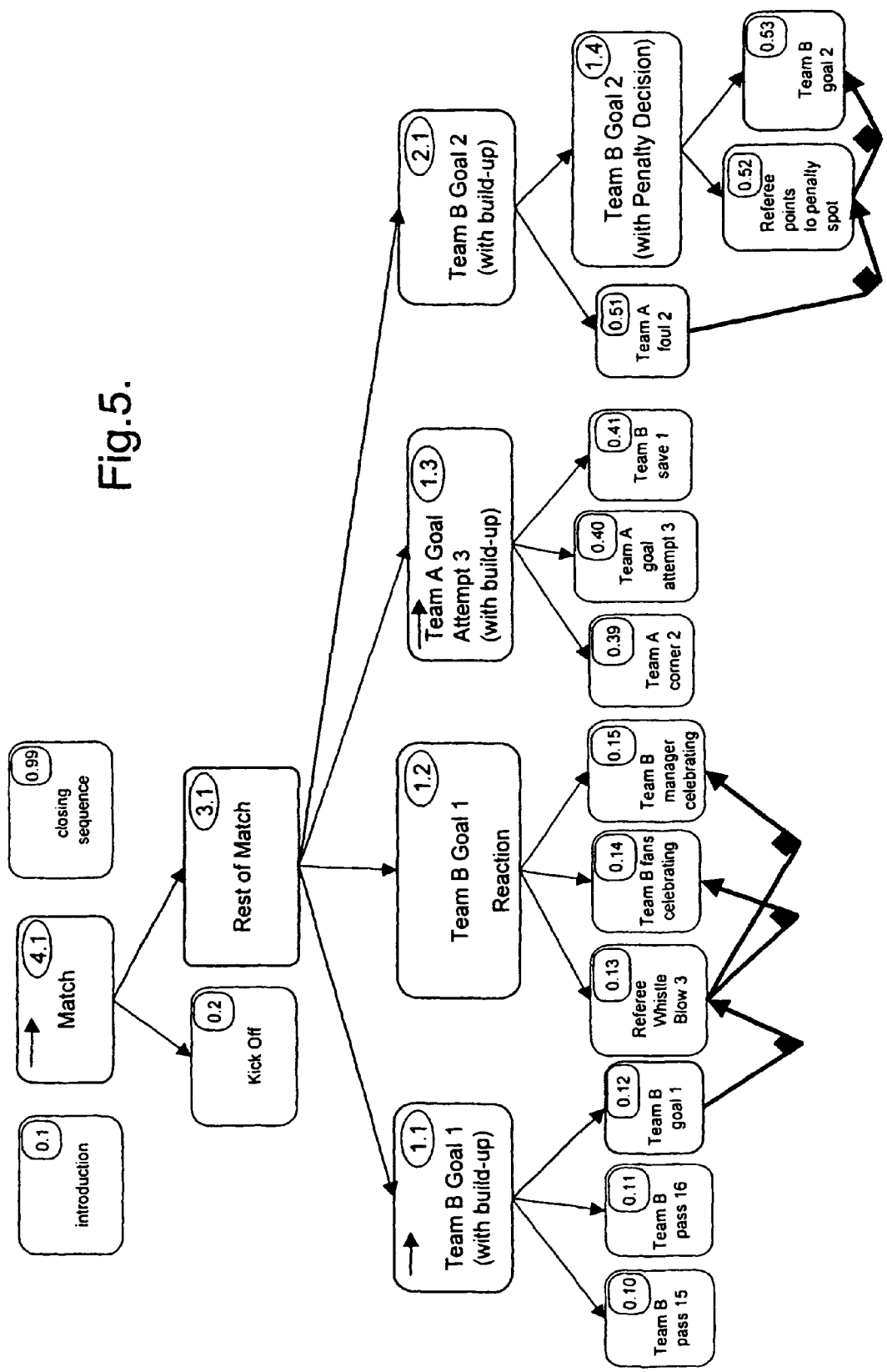
FIG. 5 is a hierarchical representation of the relationship data entered by the editor as shown in FIGS. 4A to 4H.

FIG. 5 shows the relationships entered by the editor in hierarchical form (starting with a Match media element 4.1) and therefore reflects the object hierarchy which the editor has built up within the object-oriented database 54 on the hard disk 16.

Returning to FIG. 2, the template creation tool 42 provides an interface for an editor and/or producer to specify the desired characteristics of a media article—thus creating a template object (FIG. 6). The tool stores the metadata which constitutes this template object within the object-oriented database 54.

Like a media object, a template object for use in the present embodiment conforms to a comprehensive predefined data model. As can be seen from FIG. 6, this predefined data model includes a title field, and a plurality of sections. Each section is a set comprising a name field, a query field, and, optionally, a constraint field. The template populator tool prompts the user to enter a name for the template and to indicate the section structure (top-level sections may themselves contain sections). The editor indicates the section structure using a graphical user interface component similar to the Folder List provided in Microsoft Windows Explorer® for example. In the example given in FIG. 6, the template has a flat structure of three sections.

Because the template encodes the media article characteristics using complex queries and a potentially deep structure, the editor interface divides the task of template creation between a plurality of roles. A person who is assigned an editor role defines the top-level structure of the template and a person who is assigned a producer role, (a producer normally having closer control of the actual product being created), refines the structure and adds queries (requests for information from the object-oriented database). In particular, as will be explained below, the producer specifies the linkages to the user profile thereby defining the 'balance of power' between themselves and the consumer.

The template creation tool provides an object browser which can be used to search for existing media objects and template objects. Existing templates can be modified and portions of a template can be copied into new templates.

Having defined the section structure using the graphical user interface mentioned above, perhaps using the media object browser, the editor/producer is provided with a graphical user interface which facilitates the process of query formation.

The editor uses this graphical user interface to enter query strings for each of the sections. The query string for the first section in FIG. 6 indicates that candidate media objects to fill this slot in the template must have the string "Football Intro" in their URI.

The query string for a section can be considerably more complex, as is seen in the 'Main' section of the template of FIG. 6. Here the query is written in the XPath language—the way in which that query is evaluated will be explained after the user profile metadata has been described below.

The editor also enters constraints for those sections where he wishes to place some constraint on the media elements represented by the media objects retrieved from the database in response to the query. Constraints are intended to restrict the way in which media objects are assembled by the template populator. Possible examples of constraints include time (e.g. this section must be 5 minutes long), space (e.g. this presentation must be viewed on a 640*480 pixel display), or number (there must be five news items in the 'headlines' section of a news programme).

The user profile creation tool 44 provides a user interface for generating user profiles like the user profile seen in FIG. 7.

The user profile expresses the preferences of a particular user. As with media objects and the template objects, the data must adhere to a predetermined data structure or schema. The schema dictates that each user is identified by an identifier (the numeral '1' in this case). The 'Structural' element of the user profile indicates the things the user likes—in this case, the football team Team B, especially Paulo Di Canio and Trevor Sinclair, the Essex cricket team, especially Nasser Hussain, the actress Milla Jovovich and the actor Jimmy Nail.

Figure 8:
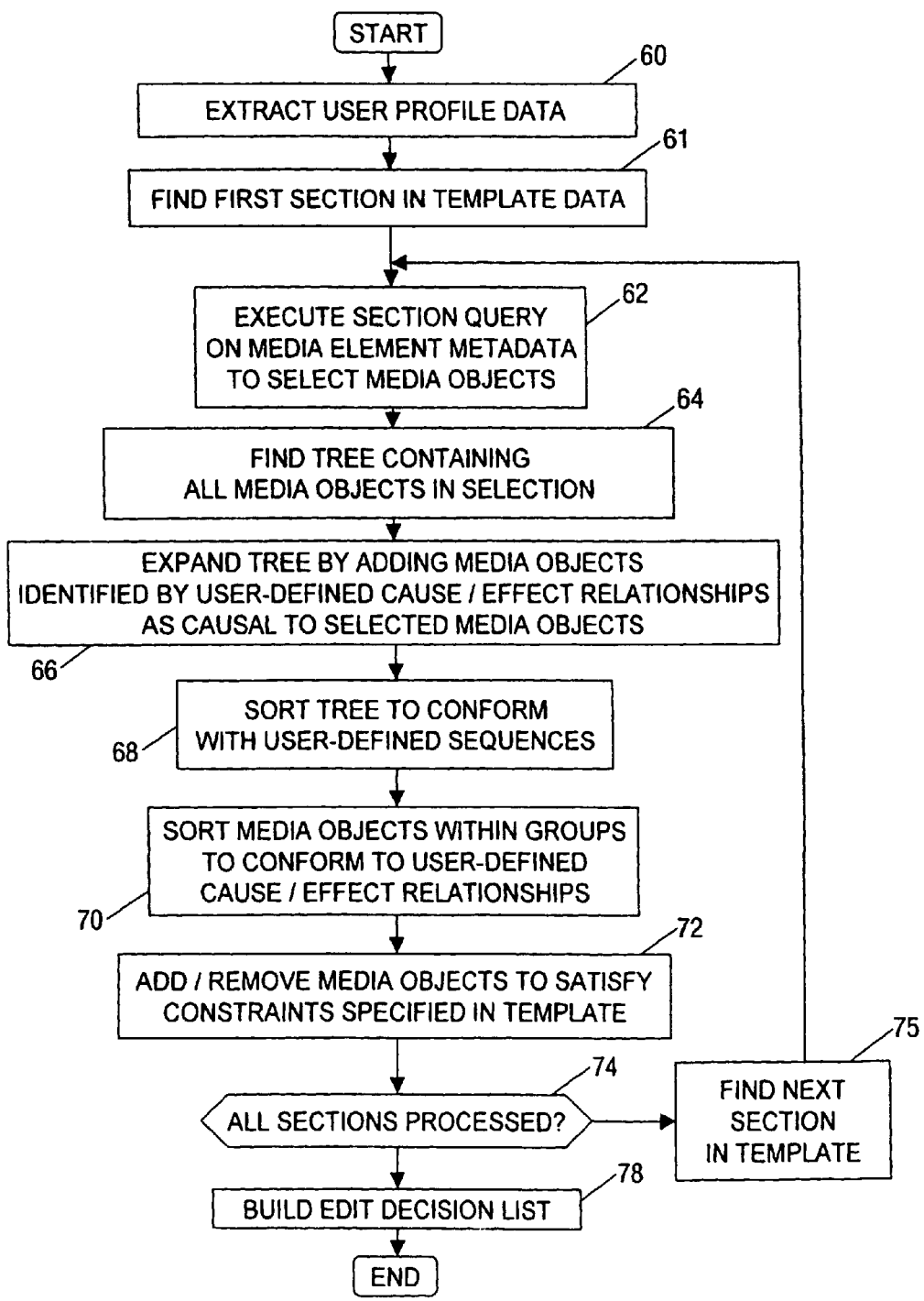
FIG. 8 is a flow chart showing the operation of the template populator component of the first embodiment of the present invention.

The template populator program module (FIG. 8) provides a process for the automatic assembly of an edit decision list in preparation for the synthesis of a set of media objects into a personalised media article for a consumer. On starting (step 60), the template populator takes as its inputs a specific template, a specific user profile, and an indicator of a store of media objects (in the present case, an indication of the location of the object-oriented database 54).

Once the specific template, user profile and store of media objects have been specified, the template populator examines (step 61) the template (FIG. 6) for any queries written in the XPath language. If such a query is found, it is resolved using the Apache Project's Xalan processor to evaluate XPaths.

For example, the query reading:
(Team is "!profile(Profile/Sports//Team)") AND
(Action is "Goal"))
is resolved, when the user profile in FIG. 7 (specified on starting the template populator program module) is considered, to:
((Team is "Team B" OR "Essex") AND (Action is "Goal"))
The template populator then identifies the first section of the template (FIG. 8) and iterates (steps 62 to 75) through the template's hierarchical structure.

Each iteration (steps 62 to 75) involves the next section in the template being found, any query in that section being executed (step 62) on the object-oriented database 54 to return a selection of relevant media objects.

Figure 9:
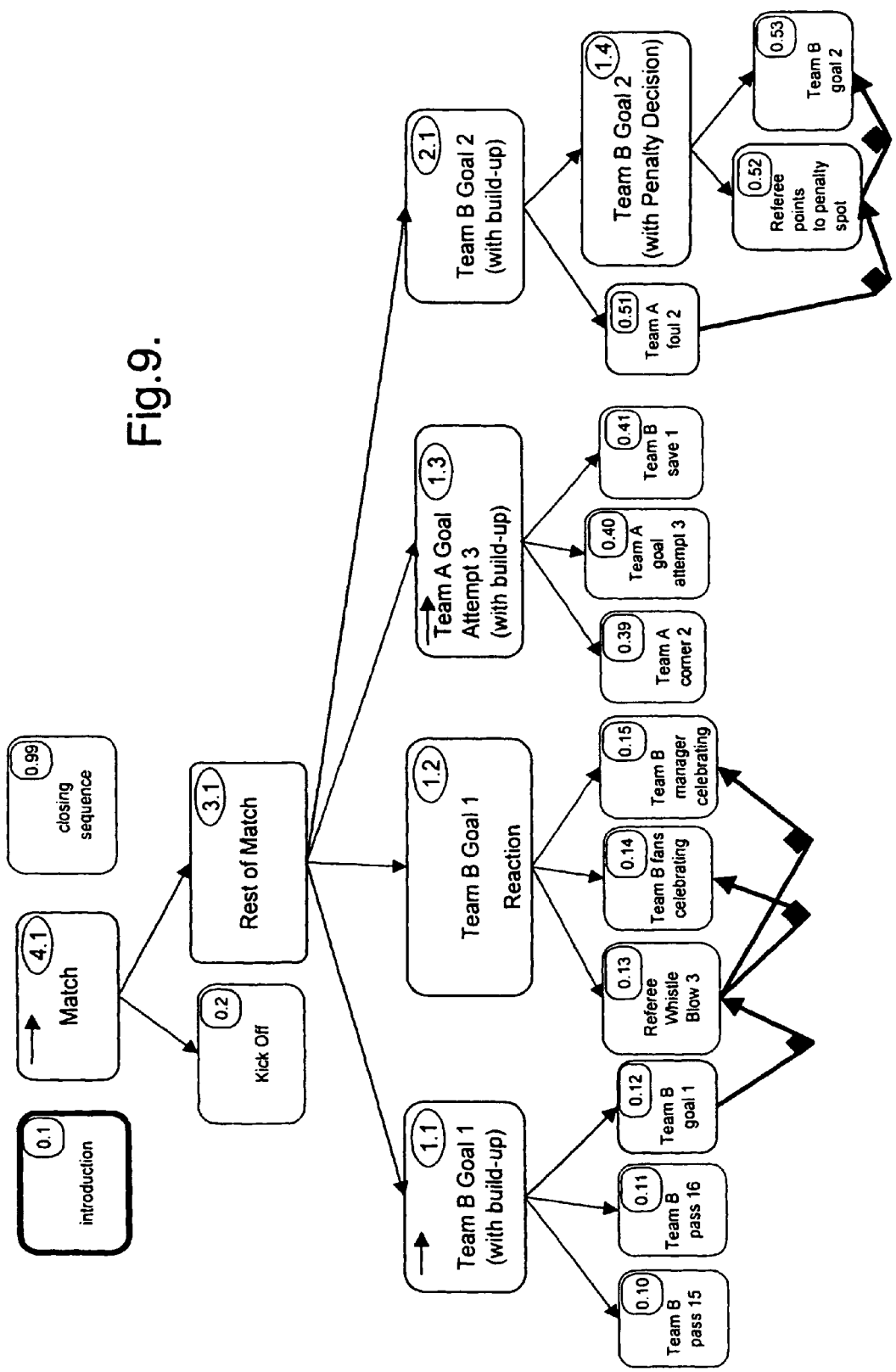
FIG. 9 shows the operation of the template populator in relation to the first section of the template illustrated in FIG. 7.

The first iteration relates to the section named 'Intro' in FIG. 6. The iteration begins (step 62) with the carrying out of the query contained with the section (i.e. URI contains "Football Intro"). FIG. 9A illustrates the selection that results in this example.

Then, in step 64, a tree is constructed which includes the selected media objects as its 'leaves'. This construction takes place as follows: The parent object of the first selected media object is retrieved followed by its parent object and so forth until an object is reached which has no parent object associated with it (the 'Introduction' object in this example has no parent object, so is the only object included in the tree). At this point, a single linked list from the leaf object to the top-level container has been reconstructed. Another selected leaf object is examined (if more than one object is selected as a result of the query), and the ancestry of that leaf object is followed until either an object is retrieved that already exists in the linked list representing the ancestry of the first object or another top-level container is encountered. Repeating this process for all the other objects in the selection reconstructs the minimal tree containing those objects.

As indicated above, in the first iteration, the resultant tree contains only the 'Introduction' media object 0.1.

The subsequent steps, in the loop of instructions (steps 66 to 72) in the template populator program which alter the tree data structure which is stored and used in generating the edit decision list, have no effect in relation to the first section of the template, so will be described below in relation to the second iteration of the loop of instructions carried out on the second section of the template.

Throughout the iteration, the tree structure is stored in the PC's volatile memory 12.

At the end of each iteration of the group of instructions, a determination is made (step 74) as to whether the final section in the template has been considered. If not, the next section is identified (step 75) and next iteration carried out.

The second iteration is carried out in relation to the central section of the Football Goals Highlights template (FIG. 6). In this case, the section query is carried out using the user profile (FIG. 7) in order to resolve the query as described above to take account of the user's preferences.

Figure 10A:
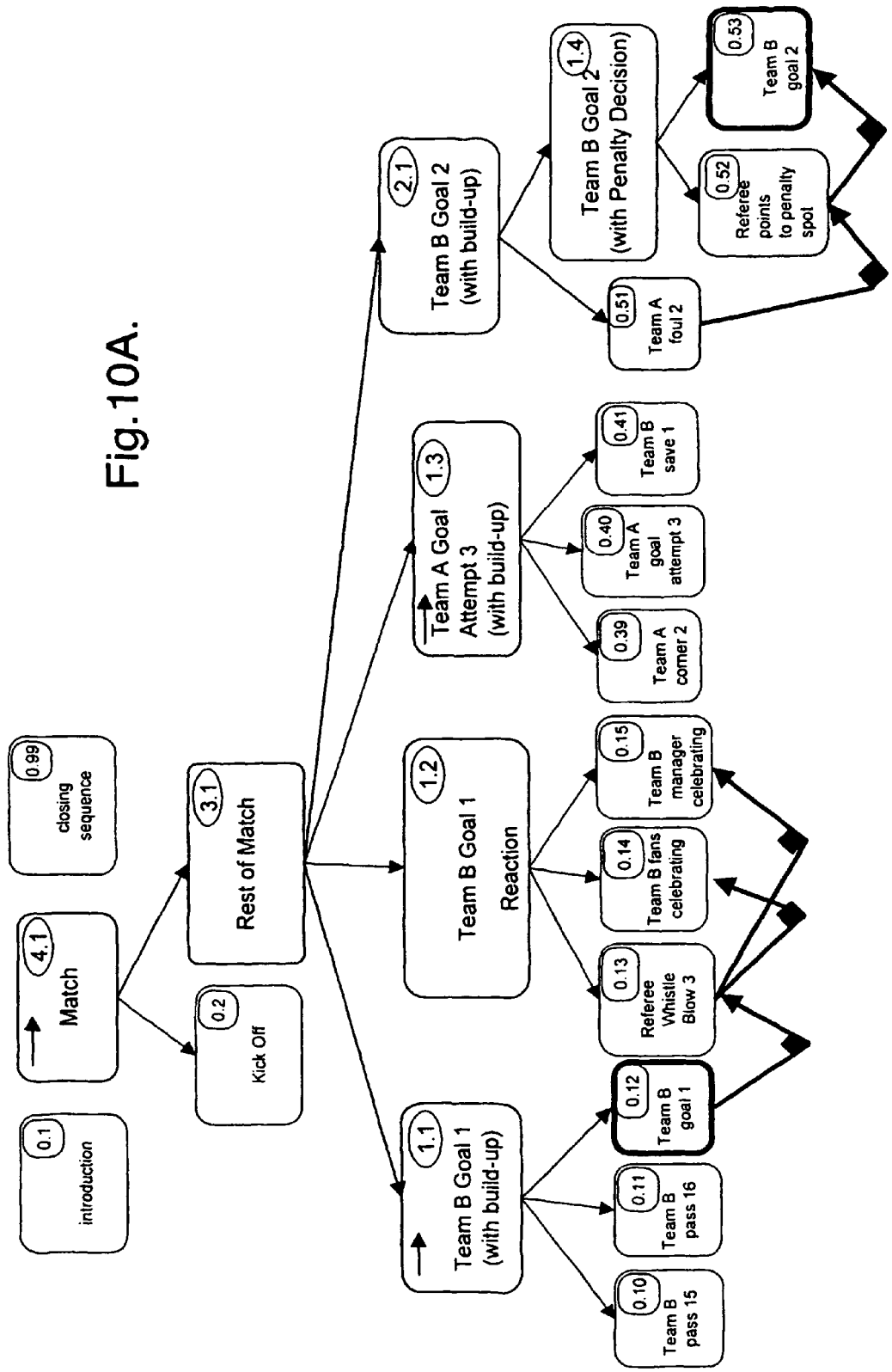
FIGS. 10A to 10D show the operation of the template populator in relation to the second section of the template illustrated in FIG. 7.
Figure 10B:
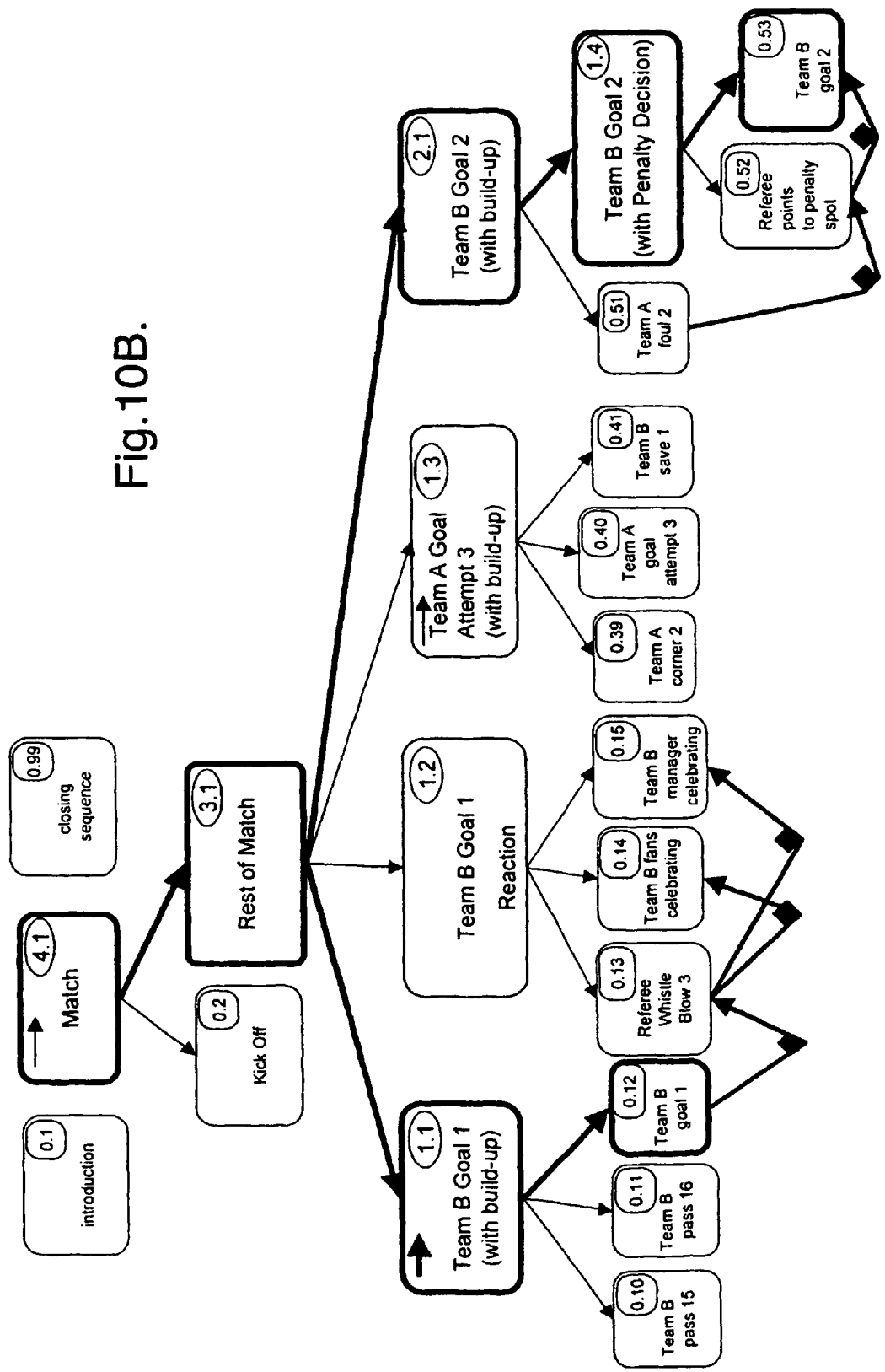

The query (step 62) results in the selection of the media elements 0.12 and 0.53 (FIG. 10A). A new tree data structure is created as described above and stores data representing the tree illustrated in FIG. 10B.

Thereafter, the selection of media objects is expanded to take account of cause/effects relationships specified by the user (step 66). In detail, this step involves the examination of the metadata of each selected media object to find how many cause objects are associated with that media object. If no cause objects are found then the media object is moved to a list of resolved media objects. If only one cause object is found, then the cause object is moved to a list of cause objects, and the media object is moved to the list of resolved media objects. If more than one cause object is found, then each possible cause object is added to a list of possible cause objects (if it is not already present in that list) and the media object is added to a list of unresolved media objects.

Figure 10C:
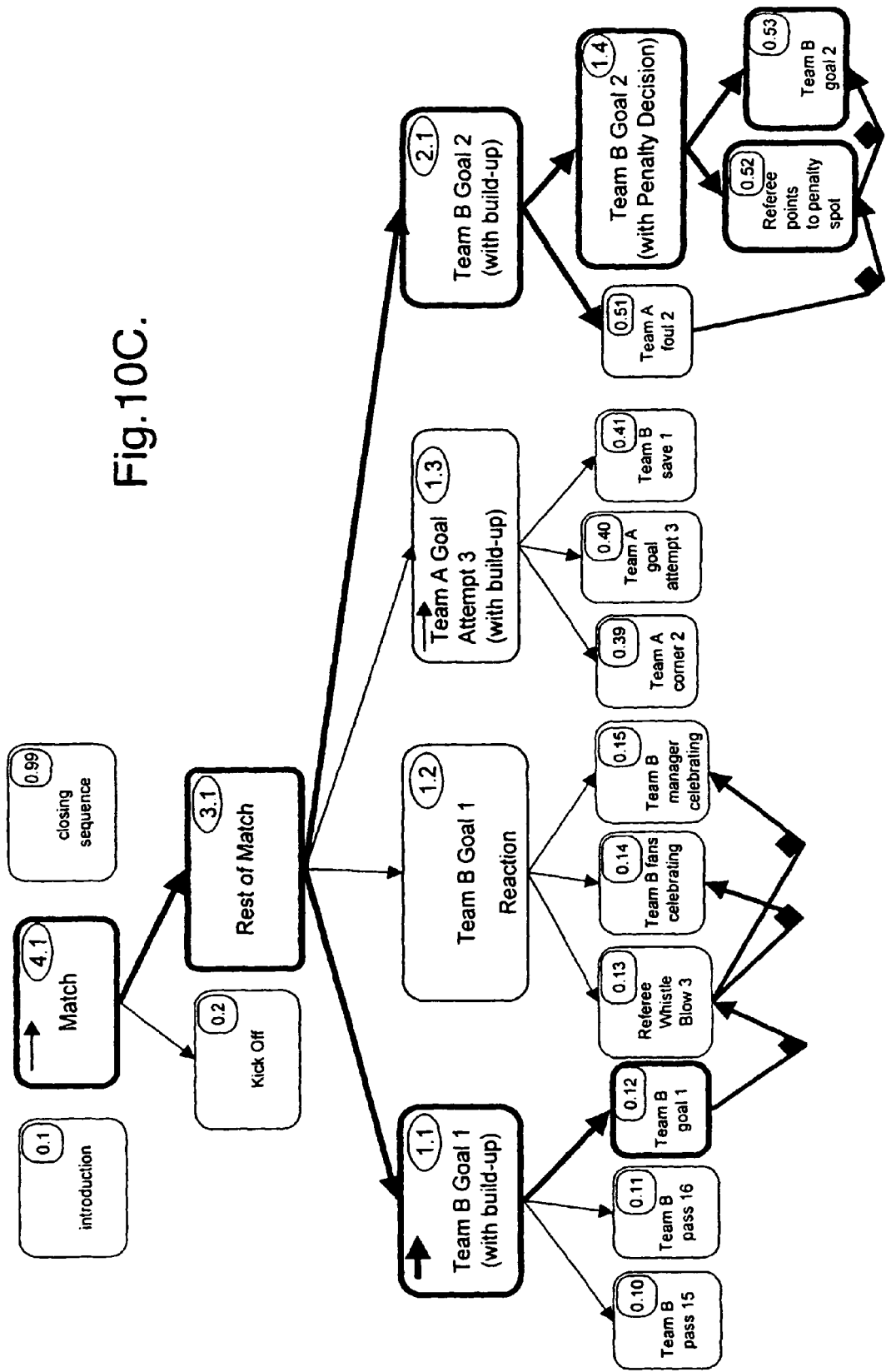

In the present example, only one cause object is found (that illustrated in FIG. 3B), so the media object 0.53 is moved to a list of resolved media objects (and added to the tree data structure associated with this iteration of the loop of instructions—as shown in FIG. 10C) and the cause object is moved to a list of cause objects.

Where a list of possible cause objects is created, the cause object which causes the most unresolved media objects is found. This cause object is moved into the list of cause objects, and the media objects it causes are added to the resolved media object list mentioned above. This process is repeated until all the list of unresolved media objects is empty. In the present example, this step is not applied.

Each cause object in the list of cause objects is then examined to find how many media objects it was caused by. If only one media object causes it, then the cause object is moved to a list of resolved cause objects and that media object is added to the list of unresolved media objects. If more than one media object causes the cause object then those media objects are added to a list of possible media objects if they are not already present.

Since, in the present example, the only cause object (CO1) in the list of cause objects is caused by only one media object (0.52), then the cause object is moved to a list of resolved cause objects and the media object (0.52) is moved to the list of unresolved media objects.

Where a list of possible media objects is obtained, the media object which causes the most cause objects is found. The cause object is then moved into a list of resolved cause objects and the media object is added to the list of unresolved media objects. This is repeated until the list of cause objects is empty.

Figure 10D:
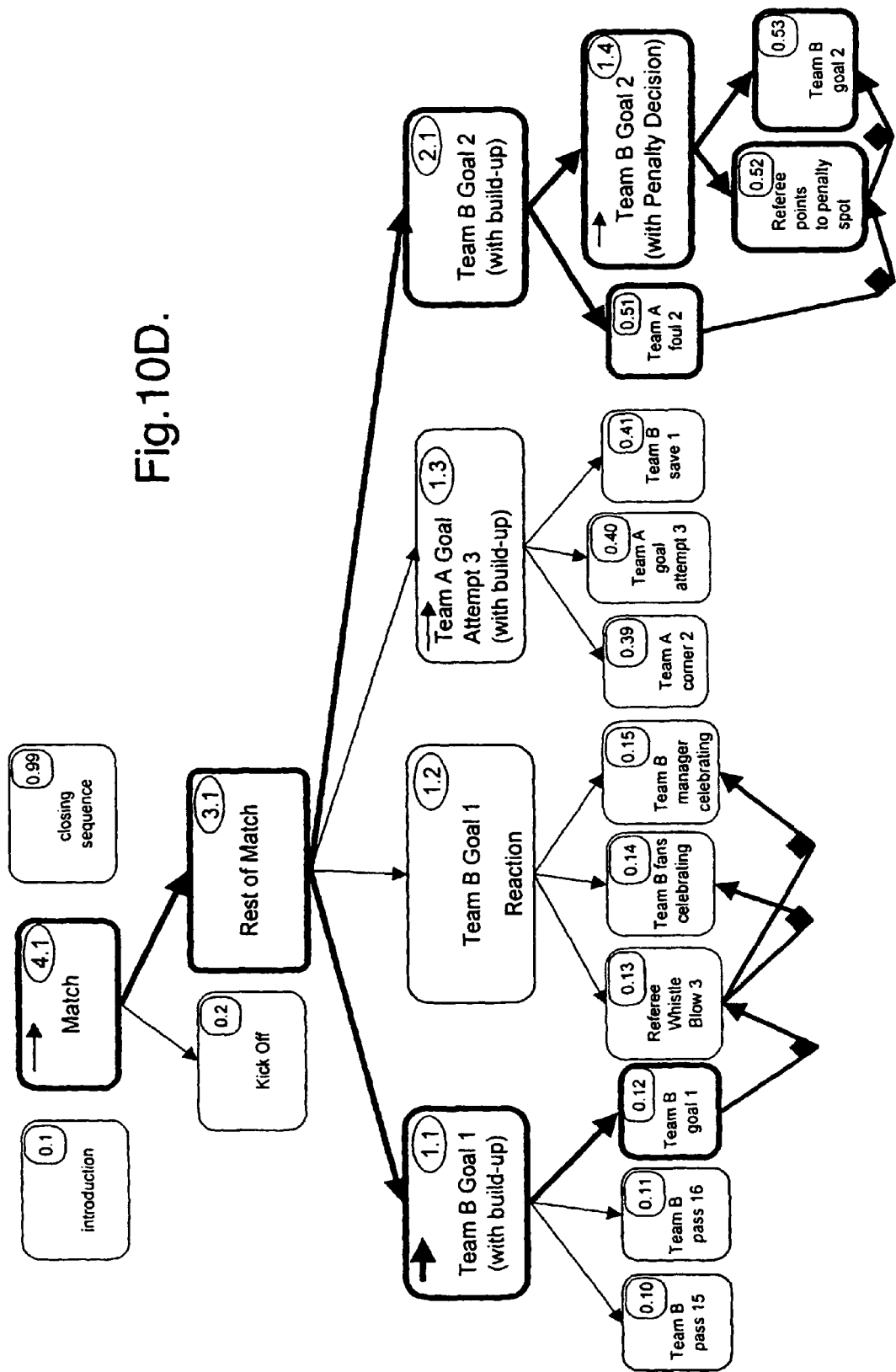

The above procedure is then repeated for any unresolved media objects (so that chains of causation are traced back to the original cause). In the present case therefore the above procedure is repeated for media element 0.52 and results in the addition of media object 0.51 to the tree associated with this iteration (FIG. 10D).

The building of the tree (steps 62 to 66) is followed by sorting (steps 68 and 70) of the objects within the tree.

The first stage of sorting (step 68) takes account of the sequence information entered by the user. The is done by using the known 'Quicksort'® algorithm to place the nodes of the tree in the correct order as identified by the sequence position metadata associated with the object. This is done starting at the top of the tree and then moving towards the leaves (i.e. the media objects) of the tree.

The second stage of sorting takes account of cause/effect linkages between the members of a group or the descendants (i.e. objects further down the tree) of the members of a group. Where groups do not have such cause/effect linkages then this stage of sorting need not be carried out on those groups.

The second stage of sorting begins by labelling each member of a group in the tree with all the causes and effects attached to it (if it is a media object) or to any of its descendants (if it is a container).

Further labels are then added to the object metadata to reflect the logical relation that if a causes b and b causes c, then a causes c. The same is done to reflect the logical relation that if f is caused by e, and e is caused by d, then f is caused by d.

The known Quicksort® algorithm is then used to ensure that causes are shown before effects. As those skilled in the art will know, implementations of Quicksort® allow the user to define a function which gives the order of two objects passed to it. In the present case, a function is provided which indicates that a goes before b is a causes b and that d comes after c, if d is caused by c.

Thus, at the end of the sorting steps (steps 68 and 70) in the second iteration, media elements 0.12, 0.51, 0.52 and 0.53 form the leaf nodes of the tree associated with the central section defined in the Football Goal Highlights template (FIG. 6).

The template populator then evaluates any constraints and updates the tree accordingly (step 72). To evaluate a time constraint, the duration of each media object included within the tree is calculated by subtracting the 'Out' property from the 'In' property, and these durations are added together to reach an actual duration. If this duration is found to be greater than the target duration, then media objects are removed from the tree. If this duration is less than the target duration, then media objects are added to the tree.

In the present embodiment this pruning or growing of the tree is done in accordance with the Interest Value metadata associated with the media objects.

Where the actual duration is longer than the target duration, the following process is carried out:

1) If the difference between the target duration and the actual duration is less than the duration of the shortest media element in the tree, then the process terminates;

2) Otherwise, a list of the media objects within the tree is created and this list is sorted in order of the 'Interest Value' property.

3) The media object with the lowest value is removed (assuming that this object is not the cause of one or more of the other media objects in the list) from the tree and the actual duration re-calculated. The difference between the target duration and the actual duration is re-calculated and the above steps repeated until the difference is less than the duration of the shortest media element remaining within the tree.

Where the actual duration is less than the target duration, the following process is carried out:

A) The query in the section is amended by removing its last 'AND' operator and the condition which follows it, or if there is no 'AND' operator, by adding an 'OR' operator followed by a condition such as 'Interest Value'>0.6. A new tree for the current section is then created in the same way as the original tree. This process is repeated until the actual duration is greater than the target duration. Thereafter, steps 1) to 3) above are carried out.

Once this pruning or growth has been carried out, the second iteration ends.

It will be clear that the third iteration will merely generate a tree comprising media object 0.99.

When all sections have been populated with media object metadata and sequenced in accordance with the queries, constraints and user preferences provided, the template populator outputs (step 78) the edit decision list (FIG. 11) by concatenating the media elements found at the leaves of the trees generated in the three iterations of the loop.

The edit decision list (FIG. 11) produced by the template populator program module (46) is passed to the content synthesiser module (48). In the present example, the content synthesiser module outputs one scene after another in a streamed video presentation or concatenates the scenes together in order to produce a programme file.

The content synthesiser provides a process to automatically synthesise a set of media elements into a personalised media article for a consumer. The synthesiser is similar to a conventional non-linear editing system in that it uses the edit decision list (FIG. 11) to locate and assemble a set of media elements into a completed media article. However, while a conventional editing tool is used only during post-production and resides on the editor's premises, the content synthesiser is a portable, lightweight application which can be deployed at the edge of the network, or actually within the consumer's device (such as a PC or personal digital recorder). This means that media articles can be synthesised at the point of delivery, with considerable benefits in terms of the level of personalisation which can be achieved. Furthermore, changes in any metadata including template, media object or user profile can be reflected dynamically in the resulting media article.

When invoked by the consumer, the content synthesiser causes a user profile and template to be passed to the template populator, which processes these as described above returning an edit decision list to the synthesiser. The edit decision list is then parsed to discover which media elements are required and how they interact with each other. A timeline comprising various references to various media elements within the content store 50 is then assembled according to this information. Transition effects (examples of which are defined in the ANSI/SMPTE 258M/1993 standard) are applied to the media where required. Finally, any caption text and graphical overlays are parsed and rendered to a static image, which is then added to the timeline with a high priority ensuring they are visible above any other graphical elements.

Once the timeline has been assembled, the personalised presentation is rendered in real time using a suitable media compositor technology, such as Apple Quicktime or Microsoft DirectShow. The modular nature of the compositor means that a content synthesiser could be more easily implemented within an embedded architecture such as a set-top box.

The graphical user interface provided by a preferred embodiment of the invention will now be described with reference to FIGS. 11 to 20.

Figure 12:
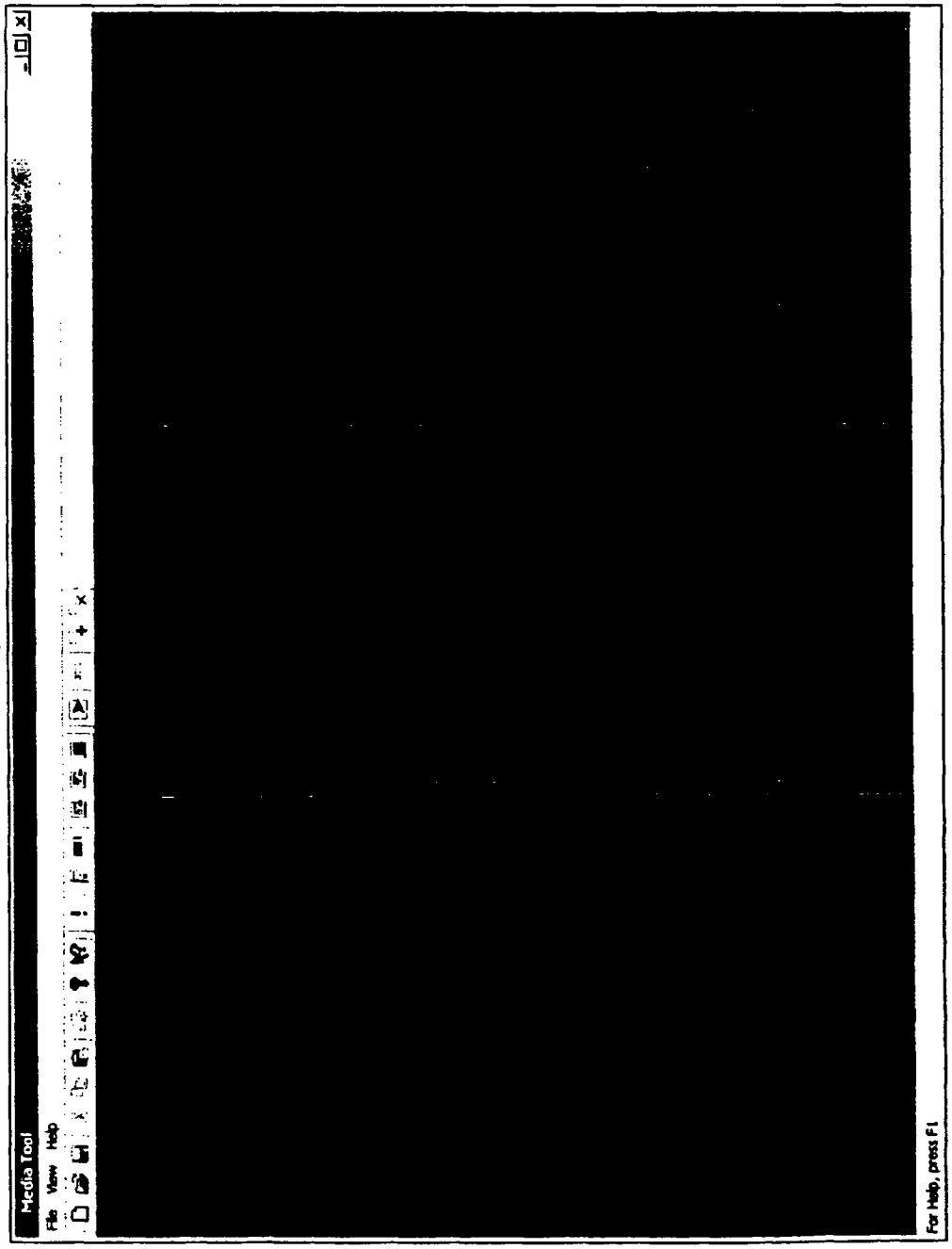
FIG. 12 shows the display presented to the user on executing a computer program which provides a preferred embodiment of the present invention.

FIG. 12 shows an application window which appears when a media article application program is run on the computer of FIG. 1. It will be seen that provides many well-known graphical user interface components.

Figure 13:
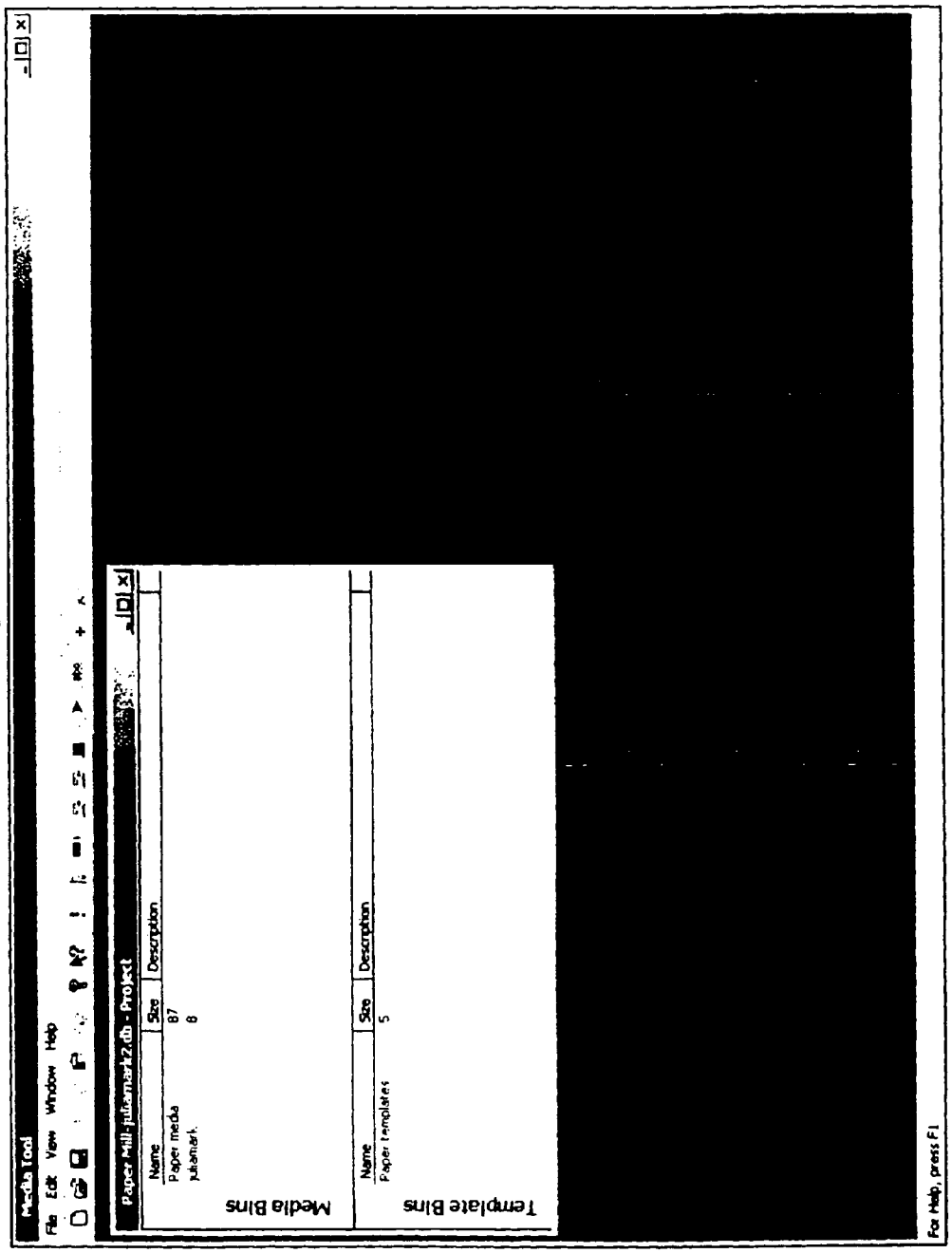
FIG. 13 shows the same display at a later stage of operation of the program.

FIG. 13 shows the display after the user has selected a 'project' by using the File menu or 'Open' button in order to select a project to open. In this preferred embodiment, the directory structure in the content store 50 is organised into project directories at the highest level, each of which contains one or more 'media bins'—i.e. directories holding a collection of media elements, and one or more 'template bins'—i.e. directories holding a collection of templates. It will be seen in FIG. 13 that, on the user opening the 'Paper Mill 03.db' project, a project sub-window is displayed showing that the 'Paper Mill 03.db' project directory contains two media bins called 'Paper Media' and 'juliamark' and one template bin called 'Paper Templates'.

FIG. 14 shows an additional sub-window which opens on the user double-clicking on the 'Paper Media' media bin. The sub-window displays a plurality of rows, each comprising a number of column entries. As can be seen, by moving the mouse pointer over the title bar of the sub-window, a list of all the attributes included in the structured data model for describing media elements is given to the user. By clicking with the mouse, a user is able to select which elements within that structured data model are displayed in the 'Paper Media' media-bin sub-window. It will be noted that the structured data model corresponds closely to the structured data model which underlies the metadata shown in FIG. 3.

Figure 15:
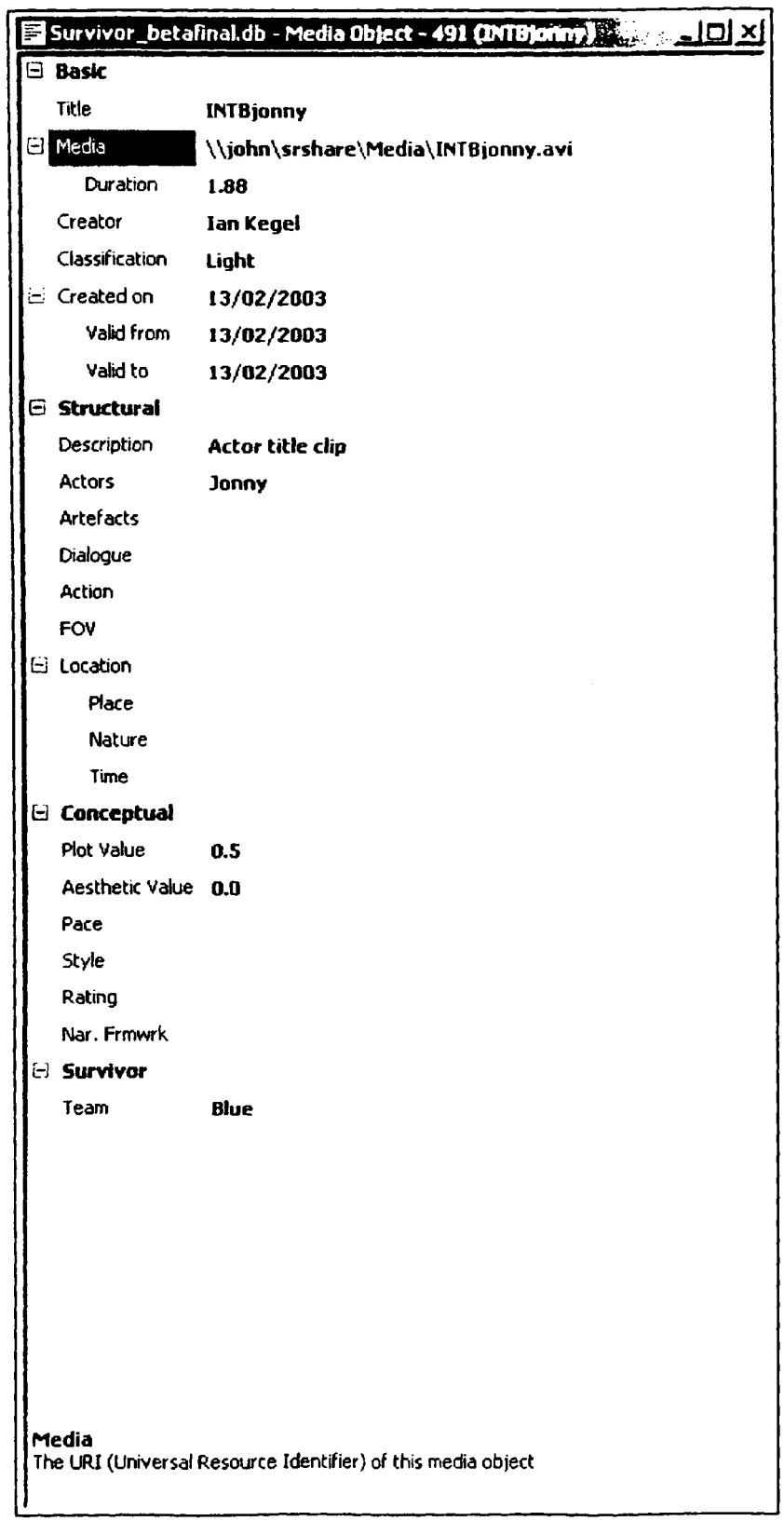
FIG. 15 shows an additional sub-window presented to the user when he selects one of the media elements contained within the selected media bin.
Figure 16:
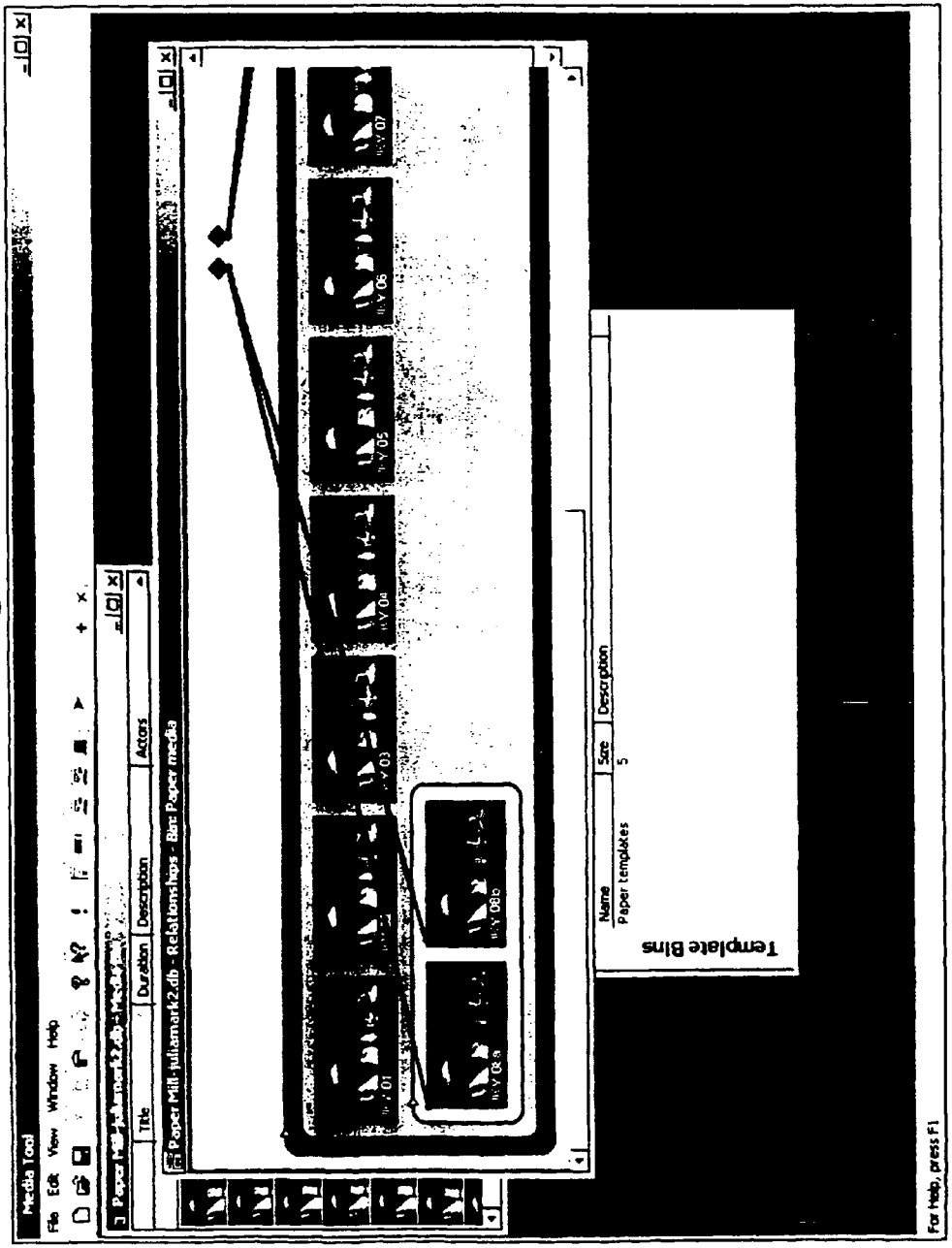
FIG. 16 shows the application window after a user indicates that he wishes to see the relationship data associated with selected (or all) media elements contained within a media bin.

On double-clicking on one of the thumbnails provided in the first column of each row, the metadata associated with the media element that the thumbnail represents is shown in a further sub-window (FIG. 15). The value given to each attribute is editable. In addition, some of the attributes have vocabularies associated with them (i.e. a limited number of predetermined values for the attribute). Where this is the case, right-clicking on the value field will cause a drop-down list to be displayed containing those predetermined values. A user can select one of those predetermined values from that list in the normal manner.

When a user selects a plurality (and possibly all) the media elements included in the sub-window illustrated in FIG. 14, right-clicks and selects the 'Relationships' option, a further sub-window is added to the display (FIG. 16) which shows the relationships between the various media elements included within the selection. In a manner similar to that shown in FIGS. 4A to 4G, groups of media elements are illustrated by enclosing the corresponding thumbnails in a solid border, sequences are similarly illustrated—save for the border including an arrow symbol near the top left-hand corner. Also illustrated are two diamonds representing cause objects as described in relation to the first embodiment. The left-hand cause object shows that a cause/effect relationship exists between media element JKY 08*a* and JKY 08*b*.

In a refinement of the first embodiment described above, the user can right-click on a diamond shape representing a cause object and is then provided with a list of options—namely, 'Backward', 'Forward', 'Bi-Directional', 'Detach All' and 'Delete'. The first three refer to the manner in which the tree expansion process described in relation to the first embodiment above expands the tree when it selects a media element which has a cause object attached to it. If 'Forward' is chosen, then the selection of JKY 08*a* will result in JKY 08*b* being added to the tree, but not vice-versa. 'backward' has the opposite effect—namely, if JKY 08*b* is selected then JKY 08*a* will be added to the tree, but not vice-versa. If 'Bi-directional' is selected then selection of either one will result in the tree expansion adding in the other. The choice of 'Forward', 'Backward', and 'Bi-Directional' is stored as an additional row of metadata in FIG. 3B.

Figure 17:
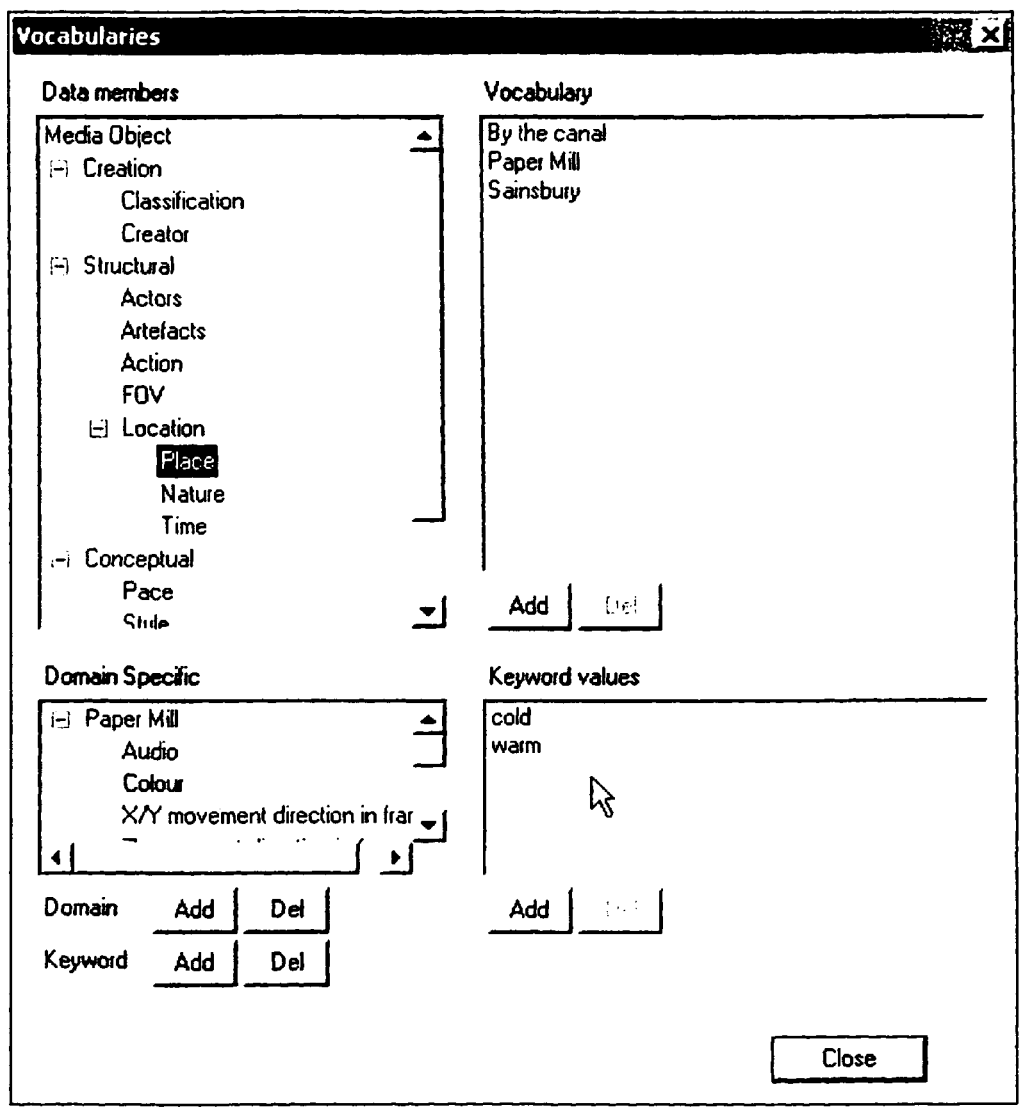
FIG. 17 shows an additional sub-window which enables the user to define vocabularies.

FIG. 17 shows a 'Vocabularies' sub-window which the user can open by selecting a 'Vocabularies' option from the Edit menu. The underlying structured data model for a media object is seen, once again, in the top-left box of the sub-window. The user may define vocabularies—i.e. lists of acceptable values for any attribute he selected in that data model. In FIG. 17, the user has selected the attribute 'Place' and has defined the values 'By the canal', 'Paper Mill' and 'Sainsbury' as possible values of that attribute—this vocabulary is associated with the currently selected project and is stored in the object-oriented database (FIG. 2-54).

FIG. 17 also illustrates the extensibility of the structured data model. This extensibility is enabled by allowing the user to add domain specific attributes (it will be remembered that examples of such attributes are included also in FIG. 3). The domain specific attributes are shown in the bottom left-hand box of the sub-window illustrated in FIG. 17, as are an 'Add' and 'Del' buttons which may be used to add or delete domain specific attributes. The domain specific attributes are added to the data model associated with the project which is currently open.

Figure 18:
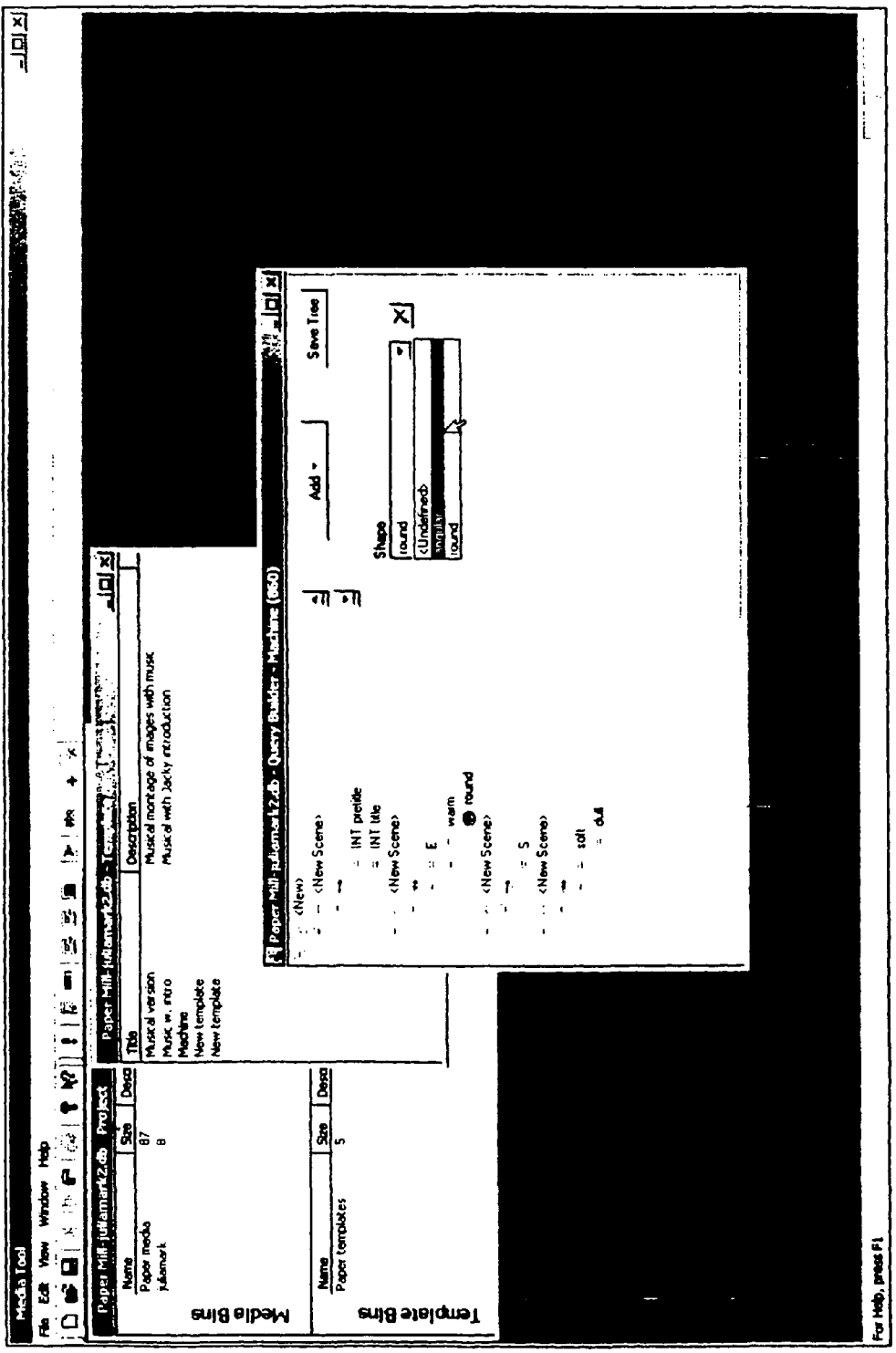
FIG. 18 shows the display after the user has selected a template for use in generating a media article, and is editing that template.

FIG. 18 illustrates the steps a user follows in order to generate template metadata akin to that shown in FIG. 6. As with the generation of media object metadata the user first opens a project sub-window. Thereafter, the user double clicks on one of the displayed template bins (in the example shown the user has double-clicked on the 'Paper templates' template bin) to bring up a 'Query Builder' sub-window. The tree structure in the left-hand side of that sub-window can be seen to be similar to the table in FIG. 6, with each '<New Scene>' corresponding to a section.

The circles in the tree structure represent filters which select media objects from the media bin. There are three types of filters as follows:

i) Circles containing '=, or >, or <, or ≠'
  these filters select, for a user-selected attribute, all the media objects in the media bin which have a value for that attribute that equals the value shown alongside the circle, or is greater than that value etc.

ii) Circles containing (*) which represent filters which select all the media objects in the media bin which contain the string shown alongside the circle.

The logical operators used to combine the results of the filtering operations are known as combiners and are displayed as triangles. There are three types of combiners called 'random', 'sequential', and 'Either/Or'.

The sequential combiner merely displays the results of the filtering operations directly below it in the tree in the sequence in which they are placed in the tree. Each sequential combiner has a straight arrow through it—examples are seen in the first and third sections of the 'Machine (860)' template seen in FIG. 18.

The random combiner displays the results of the one or more filters underneath it in the tree in a random order. A random combiner has a zigzag arrow through it. Examples are seen in the second section of the Machine (860) template seen in FIG. 18.

The either/or combiner (not illustrated) chooses the results of the two filter branches beneath it. An either/or combiner has a split arrow through it.

Figure 19:
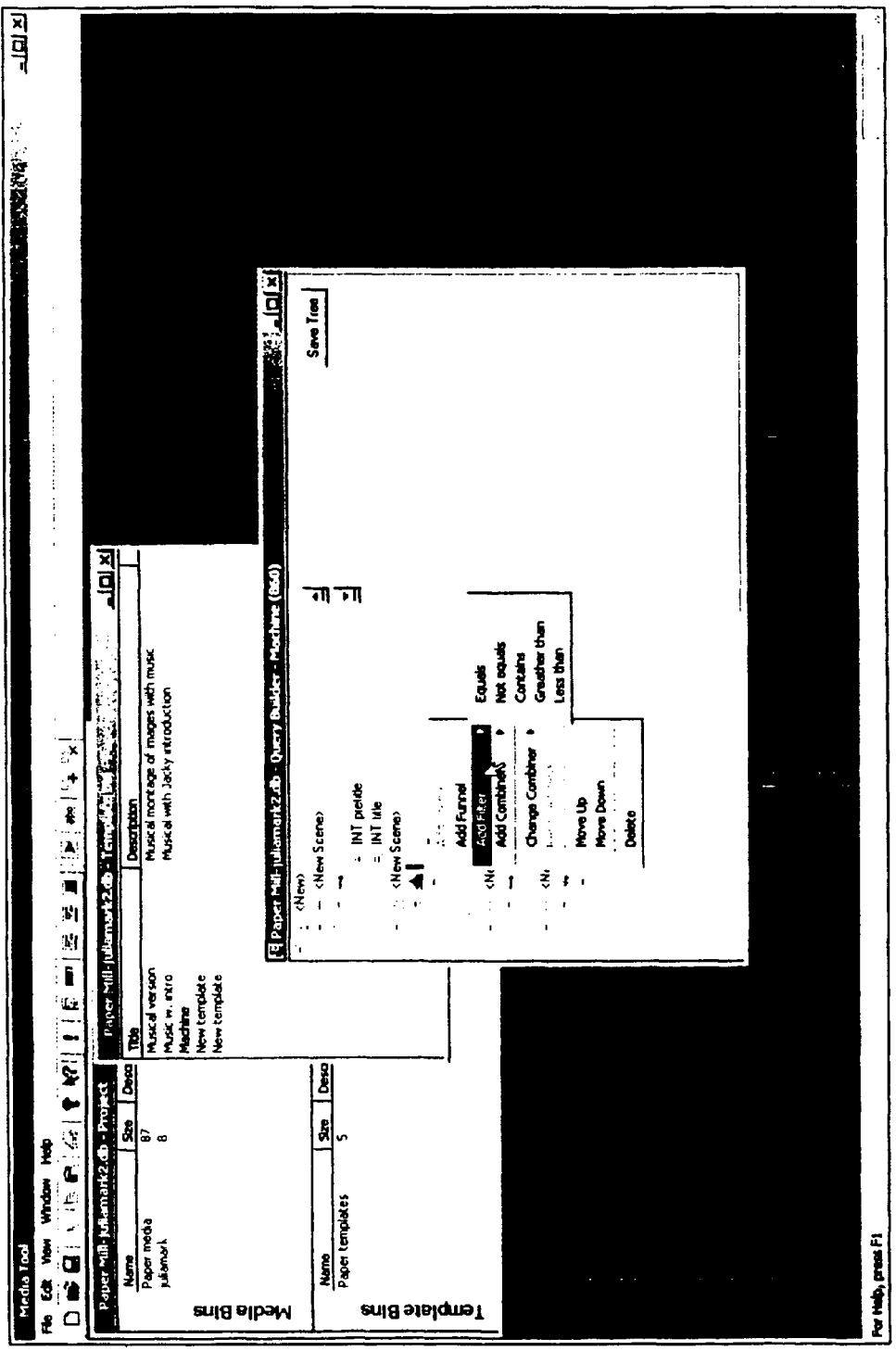
FIG. 19 shows the display after the user has selected a template for use in generating a media article, and is expanding that template.

FIG. 19 shows how a user can amend the tree and thus create template data similar to that shown in FIG. 7. When a filter is added the user is given a choice of attributes and then can enter the desired value.

Another element which can be added to a tree is a 'funnel'. This acts like a filter, allowing only a user-defined number of randomly-chosen media objects up to the higher stage in the tree.

Where filters are nested, each is applied in turn to the results of the filter lower down the tree.

Figure 20:
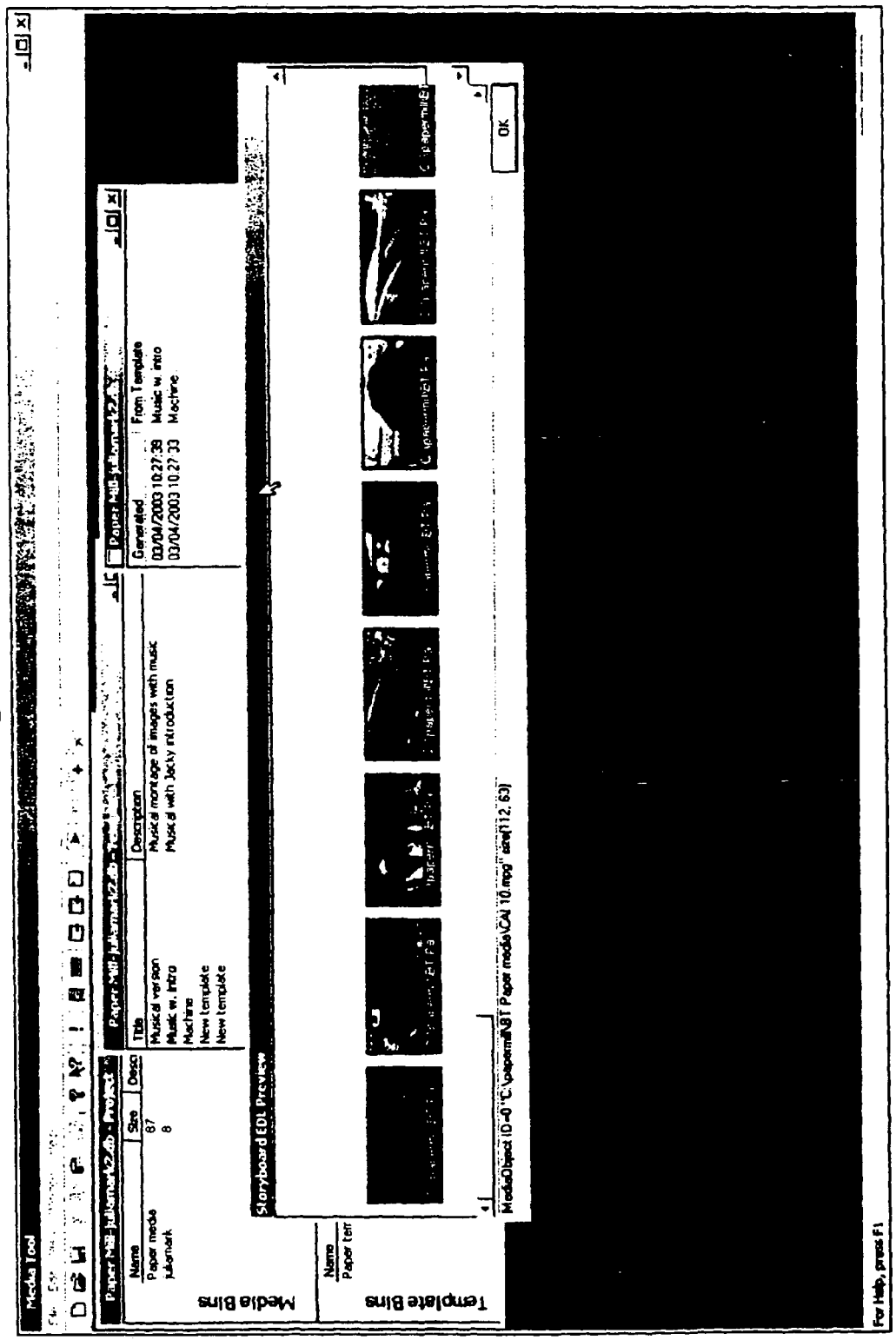
FIG. 20 shows a sub-window which is displayed to show the results of the user running the template populator component of the program.

In order to generate an edit decision list, the user clicks on the button marked '!' in the toolbar whilst a template is selected. The edit decision list is then added to an edit decision list history sub-window displayed when the appropriate button on the toolbar is pressed. Right clicking on an edit decision list in that window gives the user the options of playing a video in accordance with that edit decision list, previewing the storyboard (the result of which is shown in FIG. 20), importing or exporting the edit decision list, editing the edit decision list in its textual form or deleting the edit decision list.

Figure 21:
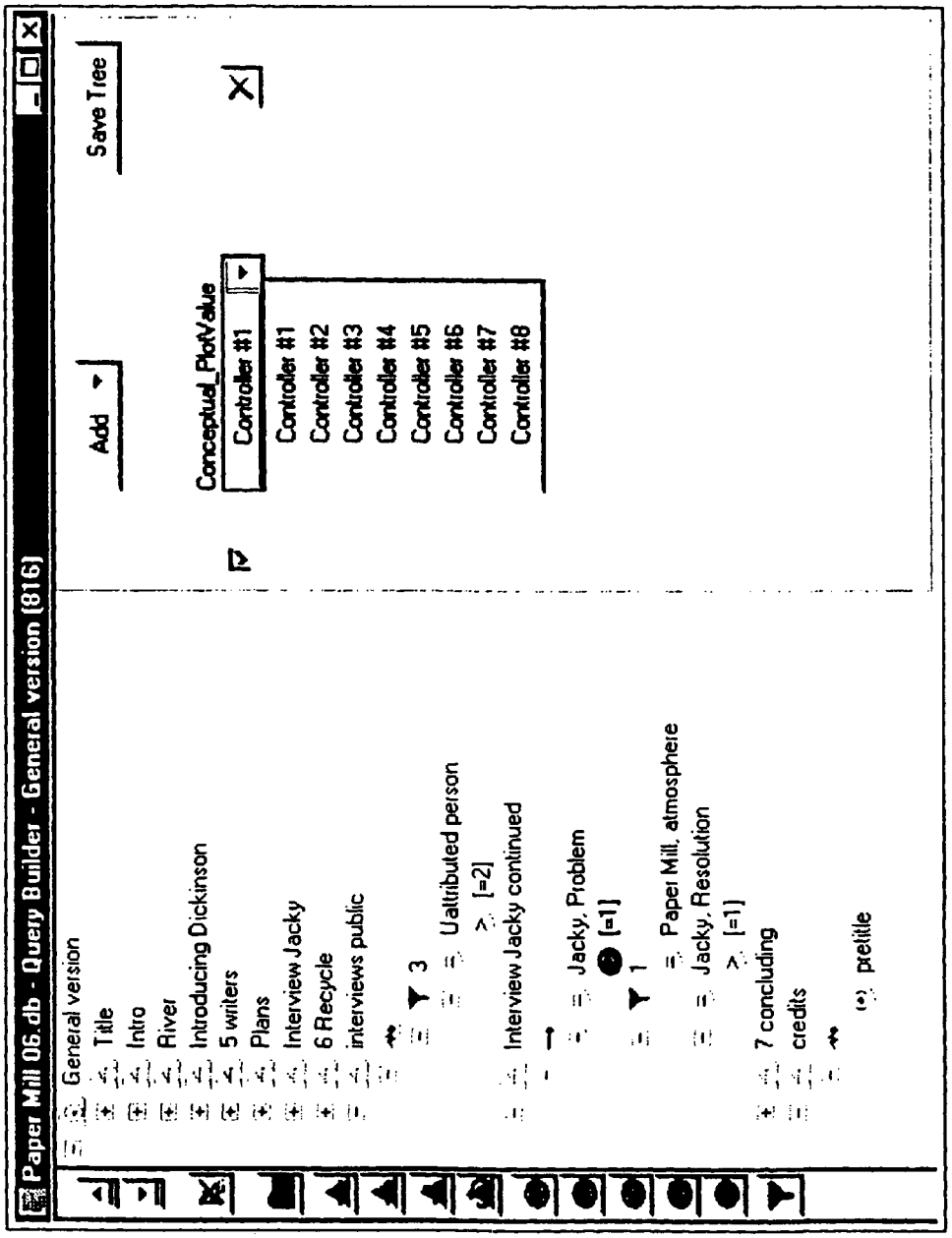
FIG. 21 illustrates additional functionality provided to a user via a query builder window (as seen in FIGS. 18 and 19) in a refinement of the preferred embodiment of the present invention.

An additional feature is provided in a refinement of the preferred embodiment of the present invention. The Graphical User Interface offering this feature to the user is illustrated in FIG. 21. On selecting the words 'Jacky, Problem', and inserting a filter, the user is presented with a check-box. On ticking that check-box, the user is provider with a list of drop-down controllers as shown. By selecting one of those controllers, the user is able to apply a 'controller' to that filter. The controller can be provided more than once (it will be seen that the first controller is applied twice in the template illustrated in FIG. 21).

Figure 22:
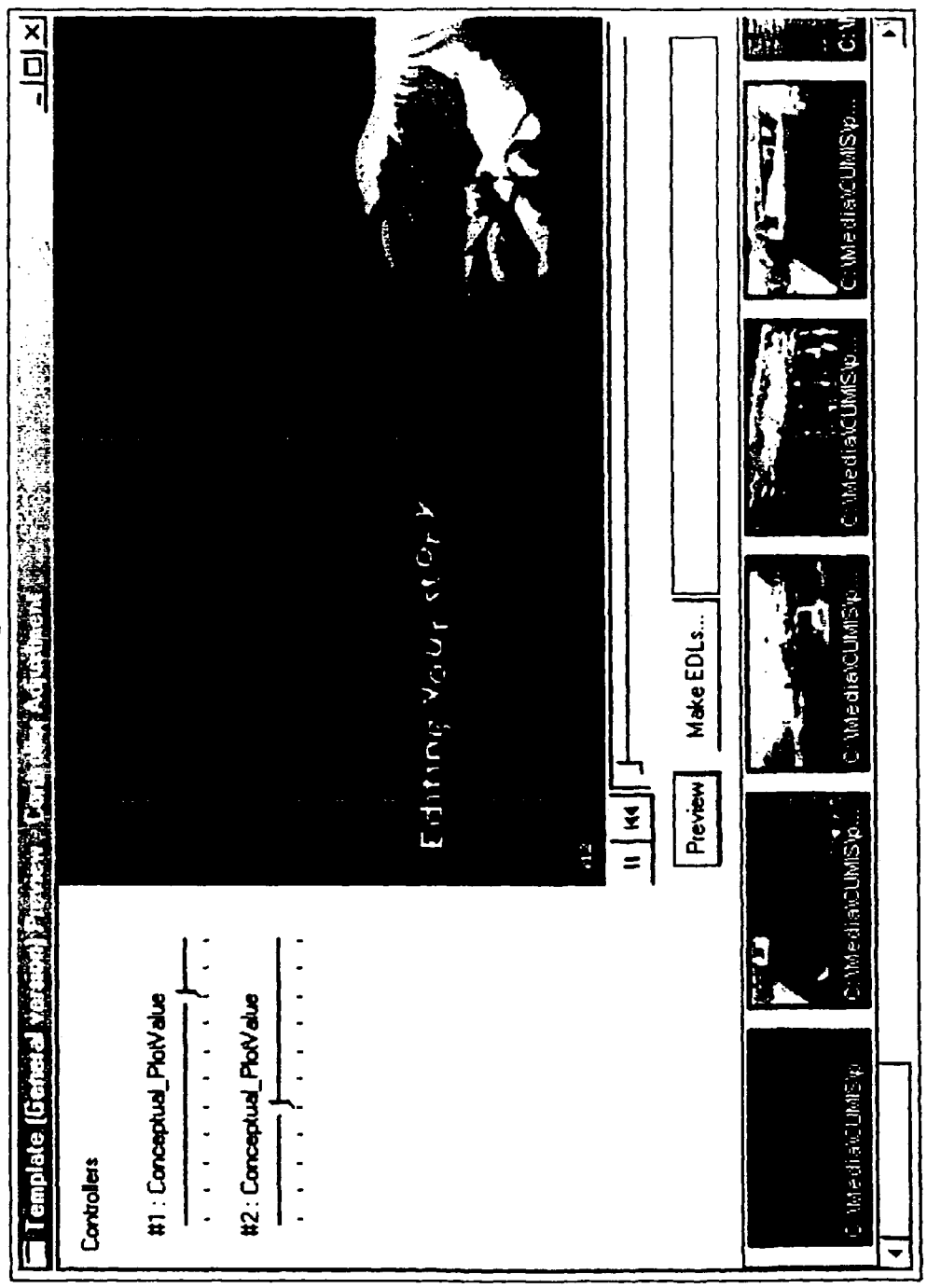
FIG. 22 shows additional controls provided to a user when previewing the media article using the refinement of the preferred embodiment of the present invention.

FIG. 22 shows a pair of slider controls can be moved by the user. By dragging, for example, the uppermost slider to a position further to the left, the 'Conceptual_PlotValue' associated with controller #1 can be reduced (and vice-versa). By altering the position of the slider, the user is able to change the template generated by the Query Builder directly from the media article preview window (FIG. 22), rather than having to re-define the filter(s). This not only provides an easier method of updating the filters within the template but also forms the basis for a simplified user interface that does not require access to the query builder and the like. In other words, a non-technical user is provided with a means for generating bespoke video presentations.

The present invention may be embodied in many different ways. For example, the embodiments described above may be altered in one or more of the ways listed below to provide alternative embodiments of the present invention (this list is by no means exhaustive):

i) in the above embodiment the input program modules generated data structures having a predetermined structure. In some embodiments, the predetermined structure is provided by a document conforming to the XML Schema guidelines;

ii) the constraints section in the template might be variable by the user—for example, a user could be provided with a graphical user interface in which he can select the duration of the media article he wishes to see. A corresponding value can then be added to the template object by the template populator program;

iii) one constraint which might be added to each selection or combination of selections could be a constraint on the number of times a given media element appears in the finished media article. It might, for example, be dictated that any media element should only appear once in a given media article.

What is claimed is:

1. A method of automatically composing a media article according to a template specifying the desired characteristics of the media article and having a plurality of sections, at least one of which contains a query, the method comprising:
   iteratively finding each section in the template and executing any query in that section to return a selection of media objects each of which is associated with a corresponding media element and comprises digital metadata about its respective media element; and
   analyzing the digital metadata of the selected media objects, which digital metadata includes:
      related media object identity data identifying a related media object, the media object containing the related media object identity data and the related media object being referred to as related media objects, and
      relationship data which indicates the type of relationship between what is represented by the respective media elements corresponding to the related media objects;
   wherein the method further comprises arranging the media elements associated with the selected media objects, or identifiers thereof, in a media article in dependence upon the type of relationship of the related media objects forming some or all of the selected media objects, or identifiers thereof, as determined by the metadata analysis.

2. A method according to claim 1 further comprising generating said related media object identity data and said relationship data.

3. A method according to claim 1 wherein said metadata of each media object further comprises content data indicating what is represented by the media object's corresponding media element, and wherein said step of iteratively finding and executing queries comprises selecting, from a plurality of media elements, one or more media elements in dependence upon said content data.

4. A method according to claim 1 wherein said arranging step arranges said media elements so as to determine the order in which the user sees or hears what is represented by the selected media elements.

5. A method according to claim 1 in which said media elements contain video data.

6. A media article composition apparatus comprising:
   one or more memory devices storing, for each of a plurality of media elements, metadata including:
      related media object identity data identifying a related media object, the media object containing the related media object identity data and the related media object being referred to as related media objects, and
      relationship data which indicates the type of relationship between what is represented by the respective media elements corresponding to the related media objects;
   wherein the apparatus further comprises one or more digital processors in communication with said one or more memory devices and operable to compose a media article according to a template specifying the desired characteristics of the media article and having a plurality of sections, at least one of which contains a query, by:
      iteratively finding each section in the template and executing any query in that section to return a selection of media objects each of which is associated with a corresponding media element;
   analyzing the metadata of the selected media objects; and,
   arranging the media elements associated with the selected media objects, or identifiers thereof, in a media article in dependence upon the type of relationship of the related media objects forming some or all of the selected media objects, or identifiers thereof, as determined by the metadata analysis.

7. An apparatus according to claim 6 in which said relationship data indicates a causal type of relationship between what is represented by one media element and what is represented by the related media element.

8. An apparatus according to claim 6 wherein said one or more processors are further operable to provide a user with an interface enabling the user to enter said relationship data.

9. An apparatus according to claim 6 further comprising a content store storing a plurality of media elements, said metadata for each media element including a pointer to the location of said media element in said content store.

10. An apparatus according to claim 6 wherein:
    said template lists a plurality of slots to be filled, and, for each slot, one or more associated requirements of media elements for filling said slot; and
    said one or more processors are further arranged in operation to select media elements by, for each of said slots, retrieving one or more identifiers of media elements whose metadata accords with said one or more requirements for said slots.

11. An apparatus according to claim 6 wherein:
    said metadata is stored in a database; and
    said one or more processors are further operable to query said database to obtain identifiers of media elements whose associated metadata meets one or more conditions specified in said query.

12. An apparatus according to claim 11 in which said database comprises an object-oriented database and metadata for each media element is stored as an object in said object-oriented database.

* * * * *